United States Patent [19]

McMahon et al.

[11] Patent Number: 5,396,239
[45] Date of Patent: Mar. 7, 1995

[54] DATA AND FORWARD ERROR CONTROL CODING TECHNIQUES FOR DIGITAL SIGNALS

[75] Inventors: Donald H. McMahon, Gansevoort, N.Y.; Alan A. Kirby, Hollis, N.H.; Bruce A. Schofield, Tyngsboro; Kent Springer, Westford, both of Mass.

[73] Assignee: Digital Equipment Corporation, Maynard, Mass.

[21] Appl. No.: 908,092

[22] Filed: Jul. 2, 1992

Related U.S. Application Data

[63] Continuation of Ser. No. 758,242, Sep. 10, 1991, Pat. No. 5,144,304, which is a continuation of Ser. No. 381,045, Jul. 17, 1989, abandoned.

[51] Int. Cl.⁶ .................. H03M 7/30; H03M 13/00; H03M 7/46
[52] U.S. Cl. .................................... 341/58; 341/59; 341/94
[58] Field of Search ............. 341/58, 59, 94, 50, 341/93, 82; 371/48, 55; 375/87, 110, 116

[56] References Cited

U.S. PATENT DOCUMENTS

| | | | |
|---|---|---|---|
| 3,629,823 | 12/1971 | Czernikowski | 341/94 X |
| 3,671,959 | 6/1972 | Amano | |
| 4,003,041 | 1/1977 | Van Duuren et al. | 341/58 X |
| 4,271,519 | 6/1981 | Hall | |
| 4,348,659 | 9/1982 | Fujimori | |
| 4,352,129 | 9/1982 | Baldwin | |
| 4,387,364 | 6/1983 | Shirota | 341/59 X |
| 4,389,636 | 6/1983 | Riddle, Jr. | 341/94 X |
| 4,394,641 | 7/1983 | Ratigalas | 341/58 |
| 4,501,000 | 2/1985 | Immink et al. | 341/58 X |
| 4,569,050 | 2/1986 | Ohme | |
| 4,620,311 | 10/1986 | Schouhamer | |
| 4,675,650 | 6/1987 | Coppersmith et al. | 341/59 X |
| 4,682,334 | 7/1987 | Le Mouel | |
| 4,723,243 | 2/1988 | Joshi | |
| 4,779,276 | 10/1988 | Kashida | |
| 4,833,470 | 5/1989 | Iketani | 341/59 |
| 4,833,471 | 5/1989 | Tokuume | |
| 4,882,583 | 11/1989 | Dimitri | |
| 5,144,304 | 9/1992 | McMahon et al. | 341/58 |

FOREIGN PATENT DOCUMENTS

| | | |
|---|---|---|
| 0043432 | 5/1981 | European Pat. Off. |
| 0097763 | 1/1984 | European Pat. Off. |
| 0250049 | 12/1987 | European Pat. Off. |
| 0269481 | 6/1988 | European Pat. Off. |
| 0317683 | 5/1989 | European Pat. Off. |
| 0396346 | 11/1990 | European Pat. Off. |
| 1540617 | 7/1976 | United Kingdom |
| 2056225 | 7/1979 | United Kingdom |

OTHER PUBLICATIONS

Shu Lin, Daniel J. Costello, Jr., "Error Control Coding" pp. 498–503, 1983.
A. X. Widmer, P. A. Franaszek, "A DC-Balanced, Partitioned Block, 8B/10B Transmission Code" IBM J. Res. Develop., vol. 27, No. 5, Sep. 1983, pp. 440–451.
IEEE National Conference on Telecommunications, YOrk, 2nd–5th Apr. 1989, pp. 47–52, A Popplewell et al., "Performance aspects of error correcting line codes".

*Primary Examiner*—Sharon D. Logan
*Attorney, Agent, or Firm*—Cesari and McKenna

[57] ABSTRACT

Input values are data encoded for improved signal characteristics (e.g., limited maximum run length and limited cumulative DC-offset) so as to form "data codewords," and then a number of the data codewords, collectively referred to as a block, are error protection encoded, preferably using a conventional linear and systematic forward error control ("FEC") code, to yield an FEC code block. Preferably, an FEC code block is formed by generating a number of check bits or FEC bits equal to the number of data codewords in the block, and then concatenating one FEC bit and its binary complement with each data codeword, so that one FEC bit and its complement is interposed between each successive codeword.

23 Claims, 14 Drawing Sheets

TABLE OF CODE WORD CHARACTERISTICS

| CODE WORD LENGTH | NUMBER OF ONE BITS IN CODE WORD | RUN LENGTH CRITERIA | NUMBER OF CODE WORDS WITH THESE RUN LENGTHS |
|---|---|---|---|
| 9 | 4 OR 5 | 2/4/2 | 89 |
| 9 | 4 OR 5 | 3/4/3 | 113 |
| 9 | 4 OR 5 | 2/5/3 | 102 |
| 9 | 4 OR 5 | 3/6/3 | 116 |
| 10 | 5 | 2/4/2 | 180 |
| 10 | 5 | 3/4/3 | 228 |
| 10 | 4 OR 6 | 2/4/2 | 124 |
| 10 | 4 OR 6 | 3/4/3 | 165 |
| 11 | 5 OR 6 | 2/4/2 | 303 |
| 11 | 5 OR 6 | 3/4/3 | 391 |
| 11 | 5 OR 6 | 2/5/3 | 359 |
| 11 | 5 OR 6 | 3/6/3 | 412 |

FIG. 2

TRUTH TABLE FOR UNBALANCE DETECTOR
OF FIGURE 3A

| INPUTS | | | | OUTPUT |
|---|---|---|---|---|
| CMD | A7 | A6 | A5 | UNBAL |
| 0 | 0 | 0 | 0 | 0 |
| 0 | 0 | 0 | 1 | 0 |
| 0 | 0 | 1 | 0 | 0 |
| 0 | 0 | 1 | 1 | 0 |
| 0 | 1 | 0 | 0 | 0 |
| 0 | 1 | 0 | 1 | 0 |
| 0 | 1 | 1 | 0 | 0 |
| 0 | 1 | 1 | 1 | 1 |
| 1 | X | X | X | 1 |

FIG. 3B

TRANSLATION LOOKUP FOR ENCODER OF FIGURE 3C

| | BALANCE INPUT | CMD | DATA | UNBALANCE OUTPUT | 3/4/3 CODEWORDS |
|---|---|---|---|---|---|
| A | 0 | 0 | 0-223 | 0 | BALANCED DATA-TYPE CODEWORDS |
| B | 0 | 0 | 224-255 | 1 | UNBALANCED DATA-TYPE CODEWORDS WITH EXCESS "1"s |
| C | 0 | 1 | 0-127 | 1 | UNBALANCED COMMAND-TYPE CODEWORDS WITH EXCESS "1"s |
| D | 0 | 1 | 128-255 | 1 | SAME AS COMMAND-TYPE CODEWORDS 0-127 OF "C", ABOVE |
| E | 1 | 0 | 0-223 | 1 | SAME AS BALANCED DATA-TYPE CODEWORDS OF "A", ABOVE |
| F | 1 | 0 | 224-255 | 0 | COMPLEMENT OF UNBALANCED DATA-TYPE CODEWORDS OF "B", ABOVE, BUT WITH EXCESS "0"s |
| G | 1 | 1 | 0-127 | 0 | COMPLEMENT OF UNBALANCED COMMAND-TYPE CODEWORDS OF "C", ABOVE, BUT WITH EXCESS "0"s |
| H | 1 | 1 | 128-255 | 0 | SAME AS COMPLEMENT OF COMMAND-TYPE CODEWORDS OF "G", ABOVE |

FIG.3D

LOOKUP TABLE FOR MEMORY OF FIGURE 4

| PRIOR BALANCE | U1 | U2 | U3 | U4 | NEXT BALANCE | S1 | S2 | S3 | S4 |
|---|---|---|---|---|---|---|---|---|---|
| 0/1 | 0 | 0 | 0 | 0 | 0/1 | x | x | x | x |
| 0/1 | 0 | 0 | 0 | 1 | 1/0 | x | x | x | 1/0 |
| 0/1 | 0 | 0 | 1 | 0 | 1/0 | x | x | 1/0 | x |
| 0/1 | 0 | 0 | 1 | 1 | 0/1 | x | x | 1/0 | 0/1 |
| 0/1 | 0 | 1 | 0 | 0 | 1/0 | x | 1/0 | x | x |
| 0/1 | 0 | 1 | 0 | 1 | 0/1 | x | 1/0 | x | 1/0 |
| 0/1 | 0 | 1 | 1 | 0 | 0/1 | x | 1/0 | 0/1 | x |
| 0/1 | 0 | 1 | 1 | 1 | 1/0 | x | 1/0 | 0/1 | 1/0 |
| 0/1 | 1 | 0 | 0 | 0 | 1/0 | 1/0 | x | x | x |
| 0/1 | 1 | 0 | 0 | 1 | 0/1 | 1/0 | x | x | 0/1 |
| 0/1 | 1 | 0 | 1 | 0 | 0/1 | 1/0 | x | 0/1 | x |
| 0/1 | 1 | 0 | 1 | 1 | 1/0 | 1/0 | x | 0/1 | 1/0 |
| 0/1 | 1 | 1 | 0 | 0 | 0/1 | 1/0 | 0/1 | x | x |
| 0/1 | 1 | 1 | 0 | 1 | 1/0 | 1/0 | 0/1 | x | 1/0 |
| 0/1 | 1 | 1 | 1 | 0 | 1/0 | 1/0 | 0/1 | 1/0 | x |
| 0/1 | 1 | 1 | 1 | 1 | 0/1 | 1/0 | 0/1 | 1/0 | 0/1 |

FIG. 4A

TRANSLATION LOOKUP TABLE FOR PRECODER OF FIGURE 5

| INPUT LINES | | | | | | OUTPUT LINES | | | | | |
|---|---|---|---|---|---|---|---|---|---|---|---|
| C2 | C1 | D15 | D14 | D13 | D12 | A9 | A8 | B7 | B6 | B5 | |
| 0 | 0 | 0 | 0 | 0 | 0 | 0 | 0 | 0 | 0 | 0 | DATA |
| 0 | 0 | 0 | 0 | 0 | 1 | 0 | 0 | 0 | 0 | 1 | DATA |
| 0 | 0 | 0 | 0 | 1 | 0 | 0 | 0 | 0 | 1 | 0 | DATA |
| 0 | 0 | 0 | 0 | 1 | 1 | 0 | 0 | 0 | 1 | 1 | DATA |
| 0 | 0 | 0 | 1 | 0 | 0 | 0 | 0 | 1 | 0 | 0 | DATA |
| 0 | 0 | 0 | 1 | 0 | 1 | 0 | 0 | 1 | 0 | 1 | DATA |
| 0 | 0 | 0 | 1 | 1 | 0 | 0 | 0 | 1 | 1 | 0 | DATA |
| 0 | 0 | 0 | 1 | 1 | 1 | 0 | 1 | 0 | 0 | 1 | DATA |
| 0 | 0 | 1 | 0 | 0 | 0 | 0 | 1 | 0 | 0 | 0 | DATA |
| 0 | 0 | 1 | 0 | 0 | 1 | 0 | 1 | 0 | 0 | 1 | DATA |
| 0 | 0 | 1 | 0 | 1 | 0 | 0 | 1 | 0 | 1 | 0 | DATA |
| 0 | 0 | 1 | 0 | 1 | 1 | 0 | 1 | 0 | 1 | 1 | DATA |
| 0 | 0 | 1 | 1 | 0 | 0 | 0 | 1 | 1 | 0 | 0 | DATA |
| 0 | 0 | 1 | 1 | 0 | 1 | 0 | 1 | 1 | 0 | 1 | DATA |
| 0 | 0 | 1 | 1 | 1 | 0 | 1 | 0 | 0 | 1 | 0 | DATA |
| 0 | 0 | 1 | 1 | 1 | 1 | 1 | 0 | 0 | 1 | 1 | DATA |
| 0 | 1 | X | X | 0 | 0 | 1 | 0 | 1 | 0 | 0 | CMD |
| 0 | 1 | X | X | 0 | 1 | 1 | 0 | 1 | 0 | 1 | CMD |
| 0 | 1 | X | X | 1 | 0 | 1 | 0 | 1 | 1 | 0 | CMD |
| 0 | 1 | X | X | 1 | 1 | 1 | 0 | 1 | 1 | 1 | CMD |
| 1 | 0 | X | X | X | X | 1 | 0 | 1 | 1 | 0 | IDLE |

FIG. 5A

TRANSLATION LOOKUP TABLE FOR PRECODER OF FIGURE 6

| | CA | CB | A8 | A7 | A6 | B7 | B6 | B5 | A9' | A8' | B7' | B6' | B5' | A7' | A6' |
|---|---|---|---|---|---|---|---|---|---|---|---|---|---|---|---|
| DATA | 0 | 0 | D | D | D | D | D | D | D | D | D | D | D | D | D |
| B-CMD | 0 | 1 | 0 | 0 | 0 | X | X | X | 1 | 0 | 0 | 1 | 0 | 0 | 0 |
| B-CMD | 0 | 1 | 0 | 0 | 1 | X | X | X | 1 | 0 | 0 | 1 | 0 | 0 | 1 |
| B-CMD | 0 | 1 | 0 | 1 | 0 | X | X | X | 1 | 0 | 0 | 1 | 0 | 1 | 0 |
| B-CMD | 0 | 1 | 0 | 1 | 1 | X | X | X | 1 | 0 | 0 | 1 | 0 | 1 | 0 |
| B-CMD | 0 | 1 | 1 | 0 | 0 | X | X | X | 1 | 0 | 0 | 1 | 1 | 0 | 0 |
| B-CMD | 0 | 1 | 1 | 0 | 1 | X | X | X | 1 | 0 | 0 | 1 | 1 | 0 | 1 |
| B-CMD | 0 | 1 | 1 | 1 | 1 | X | X | X | 1 | 0 | 0 | 1 | 1 | 1 | 1 |
| A-CMD | 1 | 0 | X | X | X | 0 | 0 | 0 | 1 | 0 | 1 | 0 | 0 | 0 | 0 |
| A-CMD | 1 | 0 | X | X | X | 0 | 0 | 1 | 1 | 0 | 1 | 0 | 0 | 0 | 1 |
| A-CMD | 1 | 0 | X | X | X | 0 | 1 | 0 | 1 | 0 | 1 | 0 | 0 | 1 | 0 |
| A-CMD | 1 | 0 | X | X | X | 0 | 1 | 1 | 1 | 0 | 1 | 0 | 0 | 1 | 1 |
| A-CMD | 1 | 0 | X | X | X | 1 | 0 | 0 | 1 | 0 | 1 | 0 | 1 | 0 | 0 |
| A-CMD | 1 | 0 | X | X | X | 1 | 0 | 1 | 1 | 0 | 1 | 0 | 1 | 0 | 1 |
| A-CMD | 1 | 0 | X | X | X | 1 | 1 | 0 | 1 | 0 | 1 | 0 | 1 | 1 | 0 |
| A-CMD | 1 | 0 | X | X | X | 1 | 1 | 1 | 1 | 0 | 1 | 0 | 1 | 1 | 1 |
| AB-CMDS | 1 | 1 | X | X | X | X | X | X | 1 | 0 | 1 | 1 | 0 | 0 | 0 |
| IDLE | 1 | 1 | X | X | X | X | X | X | 1 | 0 | 1 | 1 | 0 | 0 | 1 |
| IDLE | 1 | 1 | X | X | X | X | X | X | 1 | 0 | 1 | 1 | 0 | 1 | 0 |
| IDLE | 1 | 1 | X | X | X | X | X | X | 1 | 0 | 1 | 1 | 0 | 1 | 1 |

FIG. 6A

DATA AND FORWARD ERROR CONTROL CODING TECHNIQUES FOR DIGITAL SIGNALS

This is a continuation of application Ser. No. 07/758,242, filed Sep. 10, 1991, and now U.S. Pat. No. 5,144,304, which is a continuation of application Ser. No. 07/381,045, filed Jul. 17, 1989, now abandoned.

FIELD OF THE INVENTION

The invention relates to digital communication systems, and more particularly to improved coding techniques that facilitate accurate reception of transmitted digital signals.

BACKGROUND OF THE INVENTION

Digital communication signals to be transmitted over a communication channel such as coaxial cable or a fiber optic link typically are encoded to facilitate accurate reception at a destination despite possible corruption of the signals during transmission due to noise in the communication channel. Depending on the application, either data encoding for improved code characteristics or error-protection encoding is employed.

Data encoding entails the translation or conversion of the information or data signal's bit stream into "codewords" typically characterized by a limited maximum run length, limited cumulative DC-offset, and other signal characteristics that facilitate reception. Specifically, data encoding consists of converting an N-bit data word (or N-bit block) to an M-bit codeword (or M-bit block), where M is greater than N. The "overhead" imposed by the coding scheme is M−N, which may be expressed as a percentage as $100 \times (M-N)/N$ %. The efficiency of a coding scheme is N/M. The coding scheme adds extra "overhead" bits to the data before it is transmitted in order to convert the bit pattern of the data into a bit pattern that may be received more reliably in the presence of noise in the communication path. The encoded signal may have, for example, a limited run length, a limited cumulative DC-offset, or both.

A coding scheme which converts an N-bit data word into an M-bit codeword is often referred to as a Nb/Mb coding scheme. For example, as 8b/10b coding scheme converts 8-bit data words into 10-bit codewords.. Such a scheme has 2 bits or 25% overhead, and has an 80% efficiency.

Some encoding schemes permit two types of codewords to be encoded—data words and command words. This arises from the fact that the Nb/Mb coding scheme may be thought of as a one-to-one mapping between a set of $2^N$ possible data words and a subset of only $2^N$ different codewords out of $2^M$ possible codewords. This leaves $2^M-2^N$ codewords which never are used. However, in some codings, a small portion of the $2^M-2^N$ codewords have the same desirable transmission characteristics (e.g., run length and cumulative DC-offset) as the $2^N$ codewords which represent data. This small portion may be used to represent another class of codewords referred to as command words. It is desirable for a coding scheme to permit encoding of a substantial number of command words which have the same desirable transmission characteristics as the encoded data words.

Limiting the maximum run length in data codewords can be useful, for example, in clock recovery performed during decoding at the destination. Maximum run length is the maximum number of contiguous bits having the same value, i.e., either LOGIC ONE or LOGIC ZERO. Limiting the maximum run length, so as to reduce the length of strings of bits having the same value, is important to facilitate accurate clock recovery at the destination, because clock recovery circuits rely upon transitions between LOGIC ONE and ZERO data values to detect the underlying clock frequency of the data. Clock recovery circuits generally lose synchronization if too many bit intervals elapse without a transition in the data. Therefore, it is desirable to choose a coding scheme having a low maximum run length.

The cumulative DC-offset, also referred to as cumulative DC unbalance or digital sum variation, often is expressed in terms of the number of bit values which would have to be changed to render the bit sequence balanced. For example, if there exists a bit which would have to be a LOGIC ONE to render the sequence balanced, but that bit has a LOGIC ZERO value, then the cumulative DC-offset is one bit. Alternatively, cumulative DC-offset can be given as a single number calculated by assigning a weight of −1 to each LOGIC ZERO bit, and a weight of +1 to each LOGIC ONE bit, and then summing these weights for the bits in the serial stream. Expressed this way, the extra 2 LOGIC ZERO bits in the sequence of the above example yields a −2 cumulative DC-offset. A bit sequence having a cumulative DC-offset of zero is called "balanced," and a sequence with a cumulative DC-offset of 1 or more bits is called "unbalanced."

A bit stream transmitted to a destination consists of a sequence of LOGIC ZERO and LOGIC ONE values. A receiver circuit at the destination typically receives the two logic values as opposite polarity voltages, and the signal voltage in the receiver circuit has a near-DC (i.e., low-frequency) voltage component proportional to the cumulative DC-offset in the bit stream. Since receiver circuits can accommodate only limited DC voltage swings without overload, it is desirable to employ a code which limits the cumulative DC-offset of the encoded data in order to avoid receiver overload.

Furthermore, it is desirable to employ an encoding scheme which achieves periodic DC balance, which is defined as a cumulative DC-offset of exactly zero at the end of every group of K bits, where K is a fixed number of bits. (For example, K may be one or two times the length M of the encoded word or block.) If an encoding scheme has periodic DC balance, its bit stream has limited spectral components below a predetermined frequency proportional to 1/K, which allows a receiver circuit to employ a high-pass filter to block all spectral components below this frequency and thereby improve the receiver signal-to-noise ratio.

A number of data codes have been proposed and commercially used to varying degrees in digital communication. For example, known Manchester codes are readily implemented, have a maximum run length of 2, and are DC balanced over a period of 2 bits. Unfortunately, their 100% encoding overhead is typically deemed excessive. Another known code, the Sperry 4b/5b code, has a maximum run length of 4 and exhibits a mere 25% encoding overhead, but it can exhibit a cumulative DC-offset which grows without limit over time.

Yet another known code is the IBM 8b/10b code, which is described in an article entitled "A DC-balanced, Partitioned-Block, 8b–10b Transmission Code," that appeared in IBM J Res Develop., VOL 27, No. 5, September, 1983. The IBM 8b/10b code is decomposed into 3b/4b and 5b/6b sub-encodings. It has a maximum run length of 5,is fairly easy to implement in hardware, also has a 25% encoding overhead, and constrains the cumulative DC-offset within the bit stream to ±3 while limiting the cumulative DC-offset at the end of any 10-bit codeword to ±1. Unfortunately, for many applications, the IBM 8b/10b code permits too few command codewords, and its maximum run length of 5 is undesirably high. Additionally, its cumulative DC-offset, which is merely bounded and not periodically balanced, can present difficulties in receiver filtering.

As mentioned above, encoding is alternatively used to provide error detection and error correction mechanisms for transmitted signals. Error correction coding commonly is referred to by its initials, "ECC." A common approach to detect and correct errors in a received communication signal using an ECC is forward error control, known by the acronym "FEC." In forward error control, each transmitted word, block or frame contains additional bits of information (sometimes called "ECC," "redundancy," "protection" or "check" symbols). Employing these symbols, a receiver can detect—and, in some FEC schemes, locate the position of—errors that are present in the bit stream of the received signal. If the position(s) of the erroneous bit(s) is identified, correction is achieved simply by inverting the identified erroneous bit(s), e.g., by changing a LOGIC ONE to a LOGIC ZERO, or vice versa. In this manner, an accurate replica of the transmitted signal is obtained without requiring re-transmission.

Preferred forms of error protection encoding generate redundancy symbols using an FEC code that is both linear and systematic. In a linear code, any sum of any two encoded values results in another encoded value. In a systematic code, each codeword includes a portion identical with the unencoded data; therefore, the resulting FEC code block is formed by concatenating the unencoded data with the redundancy symbols generated by the FEC code.

An example of such an FEC code is a Hsiao code which has a Hamming distance (i.e., the minimal number of bit positions in which any two valid code blocks differ) of four. With this Hamming distance, this FEC code can correct single errors and detect double errors in the transmitted bit sequence. Such a code requires 8 FEC redundancy bits to protect a total of 64 to 127 bits in the data input, 7 bits to protect 32 to 65 bits, 6 bits to protect 16 to 31 bits, or 5 bits to protect 8 to 15 bits.

Existing FEC coding schemes generally address only the error detection/correction problem and do not attempt to improve the transmission characteristics (e.g., run length and cumulative DC-offset) of the data as discussed earlier. A need exists for an improved coding scheme that simultaneously provides error detection or correction as well as improved run lengths and cumulative DC-offset,characteristics.

SUMMARY OF THE INVENTION

According to a first aspect of the invention, input values are data encoded for improved signal characteristics (e.g., limited maximum run length and limited cumulative DC-offset) so as to form "data codewords," and then a number of the data codewords, collectively referred to as a block, are error protection encoded, preferably using a conventional linear and systematic forward error control ("FEC") code, to yield an FEC code block. Preferably, an FEC code block is formed by generating a number of check bits or FEC bits equal to the number of data codewords in the block, and then concatenating one FEC bit and its binary complement with each data codeword, so that one FEC bit and its complement is interposed between each successive codeword.

An advantage of this invention is that it permits error detection/correction, limited run length and limited cumulative DC-offset to be achieved simultaneously. Because each FEC bit is paired with its complement, the FEC bits do not introduce any cumulative DC-offset of their own, so that the resulting FEC code block has the same limited cumulative DC-offset as the data codewords. Preferably, a data encoding scheme is used, as defined by another aspect of the present invention, which achieves a zero or 1-bit cumulative DC-offset at the end of each codeword, whereby the FEC-encoded block according to the present invention also has a zero or no greater than 1-bit cumulative DC-offset.

Furthermore, the placement of an FEC bit and its complement between each consecutive codeword helps achieve a limited run length in the bit stream by preventing any run of consecutive bits having the same value from extending beyond the end of one codeword into the beginning of the following codeword. For example, if a coding scheme were designed to prevent a run of more than 3 consecutive bits within a codeword, it would still be possible for one codeword to end in 3 LOGIC ONE bits and for the following codeword to begin with 3 LOGIC ONE bits, producing a combined run of 6 consecutive LOGIC ONE bits. The present invention overcomes this problem by interposing a pair of complementary bits between the two codewords, resulting in a run length of only 4 rather than 6.

This invention may be used even more advantageously in combination with a 10-bit or 20-bit data encoding scheme according to another aspect of the present invention which limits the run length to 3 bits if the run includes the first or last bit of the codeword, and limits the run length within a codeword to 4 bits. When the inventive FEC-encoding scheme is combined with the inventive 10-bit code or the inventive 20-bit code, the resulting FEC-encoded block code has a maximum run length of 4 and a maximum cumulative DC-offset of 1 bit.

For instance, in one preferred embodiment, a 96-bit FEC code block can be formed from 8 10-bit data codewords (formed by an 8b/10b data encoder), 8 FEC bits, and 8 bits of the complements to the FEC bits. The 8 FEC bits are derived from the 80 data bits (8 10-bit codewords) using a conventional FEC algorithm such as the aforementioned Hsiao FEC scheme. These are arranged such that in between each pair of data codewords, and following the last data codeword, is an FEC complement pair, i.e., 1 bit of the FEC symbol and its 1-bit complement. The 8 FEC bits can protect the entire 96-bit block. Thus, with this encoding scheme, the overhead associated with error protection encoding is 25% (the same as the 8b/10b data encoding overhead). Another advantage of the 96-bit-block encoding scheme is that it can accommodate multiple 8-bit or 16-bit data codewords and is compatible with present 8-bit-oriented hardware and programs.

In another preferred embodiment, each 16-bit input data value is encoded into a 20-bit data codeword pair made up of a 9-bit codeword and an 11-bit codeword. The preferred 16b/20b encoding scheme limits the run length to 4 and achieves DC balance at the end of each 20-bit codeword pair. (The preferred hardware implementation comprises a precoder and respective 8b/9b and 10b/11b sub-encoders, which collectively perform 16b/20b encoding.) Then, an 8-bit FEC is generated from an 80-bit block consisting of four of the 20-bit codeword pairs. One FEC bit and its binary complement is concatenated (as a prefix or suffix) to each 9-bit and 11-bit data codeword, resulting in a 96-bit FEC block.

Preferably, in performing the data encoding used to generate the 9-, 10-, or 11-bit data codewords in the FEC versions described above, 3/4/3 maximum run length codewords are selected from a memory-stored lookup table or generated using logic devices. Such codewords have run lengths no greater than 3 for each run or sequence of bits that includes either the first bit ("beginning run length") or last bit ("ending run length") of the codewords, and a run length no greater than 4 for each intermediate sequence, i.e., each run that does not include the first or last bit.

By selecting such 3/4/3 codewords, and placing the FEC complement pairs in juxtaposition between the data codewords, inter-codeword run lengths and, of course, intra-codeword maximum run lengths are limited to 4. The reason for the inter-codeword limitation is that an ending run length of 3 plus the following single FEC bit (if of the same logic value as the ending bits of the codewords) produce a maximum string of like-valued bits of 4, as do the beginning run length of 3 and the preceding inverted FEC bit. If the FEC complement pairs were not interposed between the data codewords, the inter-codeword run lengths would be 3+3=6. Thus, by using interposed FEC pairs, shorter maximum run lengths for the bit stream of the digital signal are attained.

Furthermore, the cumulative DC-offset of the run stream is minimized by the proper selection and concatenation of data codewords. For example, in 8b/10b encoding, each input value is encoded into a data codeword having either a cumulative DC-offset of zero (i.e., a balanced codeword) or of 1 (i.e., an unbalanced code). Then, when encoding another input value into the next unbalanced codeword, its unbalance is selected to offset the unbalance of the prior unbalanced codeword. In other words, data codewords are selected to be balanced, or, to the extent possible, be paired with an associated codeword with the opposite cumulative DC-offset. Consequently, the FEC code block is balanced whenever it contains an even number of unbalanced data codewords, and has the minimum possible cumulative DC-offset of 1-bit whenever it contains an odd number of unbalanced data codewords. Therefore, the cumulative DC-offset at the end of any codeword is no greater than 1 bit.

Analogously, in the 16b/20b encoding described above, each pair of 9-bit and 11-bit segments from the encoders have opposite cumulative DC-offsets which cancel one another. Consequently, the FEC block containing a plurality of pairs of these segments is DC balanced.

According to another aspect of the invention, the complementary FEC bit pairs are used at the receiver to obtain proper framing of the FEC code block prior to decoding. Framing circuitry examines the bits of the received signal and identifies block boundaries by detecting errors in the FEC complement pairs and in the data codewords, and slipping the frame boundary until errors are minimized. Then, to decode the FEC code block, first FEC decoding is performed on the entire FEC code block to recover the FEC bits, their complements, and the data codewords, then detected errors in the data codewords are corrected, and finally data decoding is performed to recover the underlying information.

It will be evident that the above-described technique for generating data codewords having a limited cumulative DC-offset can be employed in applications that do not use error protection encoding. For example, a 2/4/2 code can be used in conjunction with this technique to obtain a maximum run length of 4 as well as a limited cumulative DC-offset in the bit stream of a digital signal. Alternatively, dummy complement pairs could be placed between codewords.

The invention comprises the various novel coding techniques mentioned above, as well as others which will be exemplified in the embodiments hereinafter set forth, and the scope of the invention will be indicated in the appended claims.

BRIEF DESCRIPTION OF THE DRAWINGS

For a fuller understanding of the nature and objects of the invention, reference should be had to the following detailed description of illustrative embodiments taken in connection with the accompanying drawings, in which:

FIG. 2 is a table showing the number of codewords conforming to various maximum run-length criteria;

FIG. 3B is a truth table for the unbalance detector of FIG. 3A;

FIG. 3D is a lookup table for the encoder of FIG. 3C;

FIG. 4A is an SELECT-UNBALANCE lookup table for the memory of FIG. 4;

FIG. 5A is a translation table for the precoder of FIG. 5;

FIG. 6A is a translation table for the precoder of FIG. 6;

DESCRIPTION OF THE PREFERRED EMBODIMENT a. Data and FEC Encoding Circuit.

Figure 1:
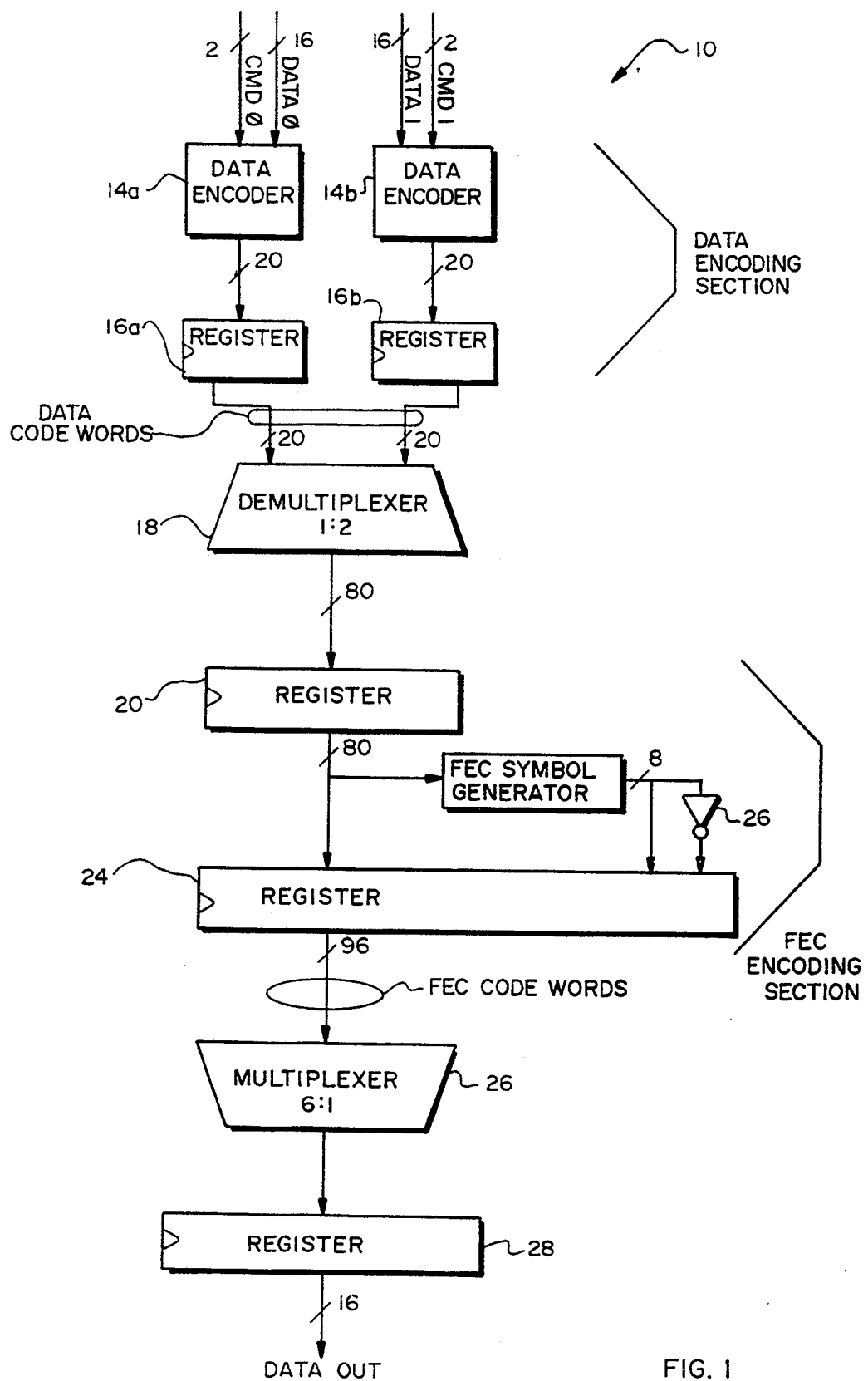
FIG. 1 is a block diagram of an encoding circuit containing a 16b/20b data encoder and an FEC encoder in accordance with a first embodiment of the invention.

FIG. 1 shows a circuit for both data encoding and FEC encoding of two 32-bit DATA signals into a 96-bit FEC code block. The DATA signals each contain two 16-bit segments DATA0, DATA1, each segment representing, e.g., data or command information and being associated with one of two 2-bit CMD signals CMD0, CMD1. Each CMD signal has a value which identifies whether the associated segment contains command information, i.e., is a command signal, or contains data information, i.e., is a data signal.

Each segment DATA0, DATA1 along with its associated CMD signal is applied to a 16$b$/20$b$ data encoder 14$a$, 14$b$. The data encoders 14$a$, 14$b$ translate the segments DATA0, DATA1 into respective 20-bit data codewords, which are then stored in a respective register 16$a$, 16$b$. The two 20-bit data codewords stored in registers 16$a$, 16$b$ are then provided to a 1:2 demultiplexer 18, which concatenates them with two other 20-bit data codewords previously or subsequently generated by the data encoders 14$a$, 14$b$.

The four 20-bit data codewords then are applied as an 80-bit block to a register 20. Preferably, each data codeword in the 80-bit block is, itself, DC balanced. If the 80-bit block contains data codewords that are not DC balanced, then, its data codewords have offsetting unbalances to the extent possible, so that the entire 80-bit block has a minimal cumulative DC-offset or is DC balanced. The technique for achieving this is described below.

The 80 bits of data codewords are then applied to both an FEC symbols generator 22 and a register 24. The FEC symbols generator 22 generates an 8-bit FEC symbol, i.e., an ECC symbol used for forward error control, from the data codewords. These FEC bits are applied both to an 8-bit inverter 26 and directly to the register 24. The inverter 26 inverts the bit values of the FEC symbol, thereby generating inverted or complementary FEC bits, which are supplied to the register 24.

The register 24 concatenates the data codewords, the FEC bits and the inverted FEC bits in an interleaved fashion. Specifically, each of the eight 20-bit data codewords is followed by one of the 8 FEC bits and its complementary bit. In other words, complement FEC pairs are dispersed within the FEC code block of encoded data. Not only does this effectively limit the inter-codeword run lengths, but also the complement FEC pairs are DC balanced and therefore leave unchanged the cumulative DC-offset of the 80-bit block.

The 96-bit FEC code block is applied to a 6:1 multiplexer 26 to produce a 16-bit DATA-OUTPUT that is then stored in register 28, ready for 16-bit serial transmission.

While the encoding circuit 10 processes 16-bit DATA inputs using two parallel 16$b$/20$b$ data encoders 14$a$, 14$b$, four parallel 8$b$/10$b$ encoders can be used instead by suitably adapting the circuit 10 as will be apparent to those in the art. Various embodiments for 16$b$/20$b$ and 8$b$/10$b$ encoding are described in detail below.

A preferred embodiment of each data encoder 14$a$, 14$b$ uses precoding and 8$b$/9$b$ and 10$b$/11$b$ subencoding. This results in 9-bit and 11-bit data codewords. The 9$b$/11$b$ partitioning of the 20B sub-block structure facilitates encoding and decoding, and permits the constraining of both maximum run length and the cumulative DC-offset. By appropriate selection of data codewords, the DC unbalance in each 9-bit and each 11-bit segment is constrained to one LOGIC ONE or LOGIC ZERO value, which is the minimum unbalance possible with odd-length segments. With 9-bit and 11-bit segments having opposite unbalances, the composite 20-bit sequence can be made to be balanced. Furthermore, use of the subset of 9-bit and 11-bit data codewords that conforms to a 3/4/3 maximum run length criteria, as explained below, limits the maximum run length to 4.

With this type of data encoding, it is preferred that, in generating the FEC code blocks, single FEC and FEC inverted bits are placed in pairs between 9-bit and 11-bit segments to reduce maximum run length.

The FEC code block thus contains a total of 16 FEC bits and 80 bits of encoded data in the form of 4 20-bit sub-block sections. Each sub-block is DC-balanced. The modular balanced 16B/20B sub-block encoding eases chip design, and enables the use of 8/5, 16/14, 32/30 as well as 64/62 data/command bit length-words.

In other words, the code block is composed of 4 structurally similar sub-blocks of 24 bits each. Each 24-bit sub-block contains 20 bits of encoded data, which is further sub-divided into 9-bit and 11-bit segments. In between each segment is one bit of the FEC and its inverse. At the end of the 11-bit segment is an additional FEC and inverted FEC bit. Since each 24-bit sub-block contains 2 FEC bits and there are 4 sub-blocks, the entire block contains 8 FEC bits. The block structure is therefore as follows:

BLOCK =
[24 bit SUB-BLOCK]  [24 BIT SUB-BLOCK] +
[24 bit SUB-BLOCK]  [24 BIT SUB-BLOCK]

SUB-BLOCK =
[9 BITS ENCODED DATA]  [FEC BIT]  [INVERSE FEC BIT] +
[11 BITS ENCODED DATA]  [FEC BIT]  [INVERSE FEC BIT]

(The "+" symbol in the preceding diagram represents concatenation, i.e., that the data represented on two consecutive lines of the page are actually one continuous bit stream.)

The FEC symbols generator 22 preferably uses a Hamming distance 4 Hsiao block encoding procedure that corrects single errors and detects double errors. To be compatible with available multiplexers and demultiplexers and other commonly-used interfaces, the code length is a multiple of 8. With 8 bits of forward error control symbols, it is possible to protect blocks (including FEC bits) containing from 64 to 127 bits. The data codeword length of 80 bits (i.e. 4 encoded 20-bit words or 8 10-bit words) is advantageous since it reduces FEC overhead and increases link efficiency.

Thus, the invention provides forward error correction capability and good signal properties (i.e., short maximum run lengths and minimal cumulative DC unbalance or periodic balance) for use, e.g., with fiber optic transmission media. The 25% overhead attributable to the data encoder section and the 25% overhead attributable to the FEC encoding section are accomplished using a block encoding procedure that is both simple and practical in implementation.

b. Introduction to Run Length.

The maximum signal run length of the bit stream can be fixed by the maximum run length properties of the individual encoded words comprising the bit stream. The run length properties of encoded words can be analyzed in terms of the beginning run length, a middle maximum run length, and an end run length. A code that is constrained to have a run length of no more than i at the beginning, a run length of no more than j in the middle, and a run length of no more than k at the end, can be termed a i/j/k maximum run length encoding, where "i," "j" and "k" are integers. For example, contiguous sequences of 2/5/3 codes will generate a serial stream that has a maximum run length of $i+k=j=2+3=5$. Likewise, a continuous sequence of 3/4/3 codewords will generate a serial stream that has a maximum run length of $i+k=6$, since "j" is less than $i+k$ for the 3/4/3 codewords. However, a sequence of 3/4/3 codewords that are separated by a series of bits selected to have a beginning and ending run length of "c" ("c" being a positive integer) will yield a maximum run length for the bit stream of the greater of "$c+i$", "j" or "$k+c$," which for 3/4/3 codewords is $c+i=k+c$. Where 3/4/3 codewords are separated by a complementary pair of bits (e.g., "1"/"0" or "0"/"1" FEC bits), $c=1$ and the maximum run length of the resulting bit stream is $1+i=k+1=4$.

The number of codes that conform to given beginning/middle/end run length criteria can be counted by listing all codewords of the required number of bits and deleting codewords that violate the run length criteria. Such a procedure can be carried out rapidly by a computer processor. For future reference, the table of FIG. 2 is a computer-generated list of the number of codes that conform to various run length criteria.

c. 8b/10b Data Encoding With FEC Complementary Pair Separators.

As mentioned above, data encoding can be performed advantageously using 8b/10b encoding. In accordance with the invention, a novel, direct 8b/10b encoding approach, using complement FEC bit pairs to restrict run lengths at each end of 10b codewords, enables $2^8$ data codes and $2^7$ command codes to be generated. This code has a maximum run length of 4, a maximum cumulative DC-offset of 4 one or zero bits within a codeword, and a maximum cumulative DC-offset at the end of each codeword of a single bit.

With this 8b/10b code, it is not possible consistently to have periodic code balance (i.e. balance at the end of each codeword); there are only 228 balanced 10-bit codewords that satisfy the 3/4/3 run length criterion, not enough to allocate a separate 10-bit balanced codeword to each of the 256 possible 8-bit uncoded data words. The best that can be achieved is to limit the cumulative DC-offset at the end of each codeword to a single "1" or "0" bit. According to the present invention, this is accomplished by mapping as many as possible (up to 228) of the 8-bit data words onto balanced 10-bit codewords, and mapping each of the remaining 8-bit data words onto one of two alternative 10-bit codewords that are bit-wise complements of each other and have an unbalance of only one bit. Whenever an 8-bit data word is to be encoded which maps onto one of the unbalanced 10-bit codewords, the encoder selects that one of the two alternative codewords for that data word that tends to restore cumulative balance.

In other words, if the cumulative unbalance contains an excess of "1"s, the next unbalanced codeword is selected to have an unbalance of the opposite sign, i.e., an excess of "0"s. This is achieved by selecting, as the second unbalanced codeword, one whose unbalance is opposite to that of the first. By so selecting the unbalanced codewords to offset the unbalance of the most-recent prior unbalanced codeword, the net cumulative DC-offset at the end of any block of codewords (and hence at the end of a complete message) will not be greater than a single "1" or "0" bit. Therefore, although the bit stream is not assured of being periodically balanced, the cumulative DC-offset is constrained to be within well defined limits.

The number of available codewords meeting the aforesaid run length and cumulative DC-offset criteria can be calculated. The total number of balanced 10-bit words is the combination of 10 items taken 5 at a time, or $10!/(5!*5!)=252$. Therefore, it is impossible to represent $2^8=256$ data values with balanced 10-bit codewords. Moreover, as shown in the table of FIG. 2, there are only 228 balanced 3/4/3 codes; 3/4/3 codes are preferred because they can be used with complementary FEC bit pairs to create maximum run length 4 bit streams. However, as also shown in FIG. 2, there are additional codewords that have an unbalance of a single "1" bit (i.e., six "1"s and four "0"s), 165 of which meet the 3/4/3 criteria. Likewise, there are an equal number of codes that have an excess "0" bit. Therefore, 228 input values can be represented with balanced codewords, and an additional number (up to 165) of input values can be represented by either of two minimally unbalanced 10-bit codewords, each one of the codewords being the bit-wise complement-of the other. With this approach, there are a total of $228+165=393$ 3/4/3 codes available for use. Of these 393 10-bit codewords, 256 are needed to encode the 8-bit data words, so the remaining 137 10-bit codewords are available to encode up to 137 different command words (i.e., more than enough to encode the 128 possible 7-bit command words). Thus, with this encoding scheme a 10-bit codeword can represent an 8-bit data word or a 7-bit command word. The use of 3/4/3 codes separated by complementary FEC bit pairs guarantees a maximum run length of 4.

d. Illustrative Embodiment of a Single, Direct 8b/10b Data Encoder.

Figure 3A:
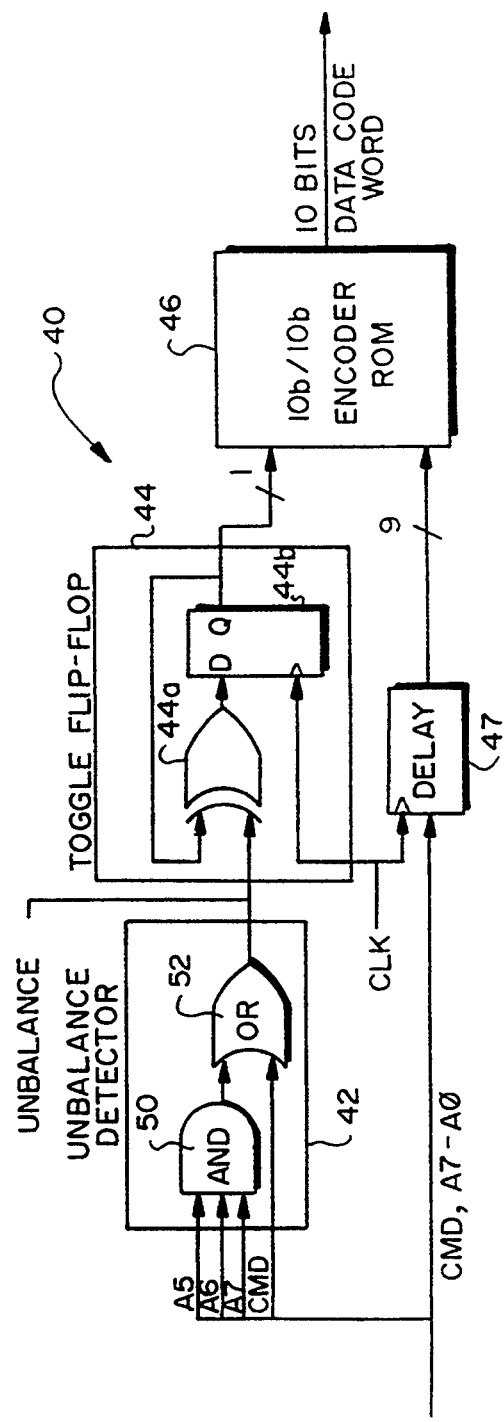
FIG. 3A is a block diagram of a single, direct 8b/10b data encoder in accordance with a second embodiment of the invention.

FIG. 3A depicts a single, direct 8b/10b data encoder 40. The encoder 40 includes an unbalance detector 42, a toggle flip flop circuit 44 and a memory 46. The encoder 40 distinguishes between 8-bit input words whose corresponding 10-bit codewords are balanced from those whose codes are unbalanced. For those latter input values that have been mapped onto complementary pairs of unbalanced codewords, it selects an unbalanced codeword that takes the prior run stream history into account and produces a code stream exhibiting the minimum unbalance. Thus, whenever a codeword has more LOGIC ONE's than LOGIC ZERO's, the next unbalanced codeword selected by the encoder 40 will be of the opposite unbalance, i.e., more LOGIC ZERO's than LOGIC ONE's.

The unbalance detector 42 tests whether the code will be balanced or not; that is, it recognizes whether a codeword is unbalanced. When a codeword is unbalanced, the unbalance detector 42 generates an UNBALANCE signal whose value is LOGIC ONE. When the codeword is balanced, the UNBALANCE signal value is LOGIC ZERO.

The unbalance detector 42 has an AND gate 50 to which the three most significant bits (MSB's) of the input signal are fed as separate inputs A5–A7. (The least significant bits (LSB's), designated A0–A6 are not used in the unbalance detector 42 for reasons described below.) The output of the AND gate 50 is applied as a first input to an OR gate 52, with the other input being a CMD signal indicative of whether the input Signal contains command information. The output of the OR gate 52 is the UNBALANCE signal.

The operation of the unbalance detector 42 can be understood with reference to the corresponding truth table given in FIG. 3B. To understand the table, however, consider the following: It can be seen from FIG. 2 that there are 228 10b balanced codewords (i.e., 10b codewords having 5 LOGIC ONE's) that also have 3/4/3 maximum run lengths, and 165 10b codewords having unbalances of 1 (i.e., codewords having 4 or 6 LOGIC ONE's) and 3/4/3 maximum run lengths. Converting these numbers of codewords to binary yields:

228 (dec) = 11100100 (bin)
165 (dec) = 10100101 (bin)

These numbers can be rounded down, resulting in 224 (dec) = 11100000 (bin) balanced codewords and 160 (dec) = 10100000 (bin) unbalanced codewords available which meet the stated 3/4/3 maximum run length criteria. Thus, input data signal values less than 224 ($11100000_2$) can be represented by balanced codewords, input data values from 224 to 255 can be represented by unbalanced codewords, and input commands from 256 to 383 (a total of 128) can be represented by unbalanced codewords. With this scheme, the criterion for recognizing an unbalanced codeword is that the three most-significant bits (A5, A6, A7) are 1's.

Now, with that background information having been given, the table of FIG. 3A can be readily understood. In the table, "1" indicates a LOGIC ONE, a "0" indicates a LOGIC ZERO, and an "x" indicates either a LOGIC ONE or LOGIC ZERO. By using only the three most significant bits of the data input signal and the command signal, the unbalance detector circuit 42 is simplified.

As can be seen, the output of the AND gate 50 is a LOGIC ZERO when its three input lines A7–A5 are not all "1," which indicates input signal values below 224 and corresponds to balanced codewords. The output of the AND gate 50 is a LOGIC ONE whenever its input lines all assert "1," which indicates input signal values equal to or above 224 and corresponds to unbalanced codewords. The OR gate 52 generates an UNBALANCE signal having a value of LOGIC ONE whenever the output of the AND gate 50 is a LOGIC ONE or whenever the CMD signal is asserted, i.e., has a LOGIC ONE value, which, in either case, indicates an unbalanced codeword. On the other hand, the OR gate 52 generates an UNBALANCE signal having a value of LOGIC ZERO whenever any of the input signal bits are LOGIC ZERO, which indicates input signal values less than 224, and the CMD signal is not asserted. This condition corresponds to balanced codewords.

The toggle flip flop circuit 44 serves to preserve the present state of the UNBALANCE signal until the next unbalanced code is generated, using an exclusive OR gate 44a and a memory device such as a D-type flip flop or register 44b to store the last UNBALANCE signal. Each time the next codeword to be transmitted is unbalanced, the flip flop reverses its state. The output of the toggle flip flop circuit 44 is applied to the memory 46 for selecting the appropriate code balance for the next unbalanced code.

The memory 46 preferably is implemented as a read-only memory ("ROM") or programmed logic array ("PLA"), and performs a 10b/10b encoding by using a stored lookup table of codewords. The lookup table provides a 10-bit codeword for each 10-bit input. The 10-bit input consists of the single-bit UNBALANCE output of the toggle flip flop circuit 44, as well as the command signal CMD and data bits A7–A0, which are applied to the memory 46 after being delayed (in a delay device 47, such as a register bank) to arrive in the same clock cycle as the corresponding output of circuit 44. The memory 46 implements the codeword-assignment scheme outlined above, and, for those data inputs represented by two complementary unbalanced codewords, it chooses between the two codewords in accordance with the UNBALANCE output of the toggle flip flop circuit 46 so as to offset a previous unbalance of a prior encoded input. The codeword assignments needed to accomplish this use the output from the toggle flip flop circuit 44 to determine what the unbalance of the codeword should be, on the basis of the last input's unbalance.

Figure 3C:
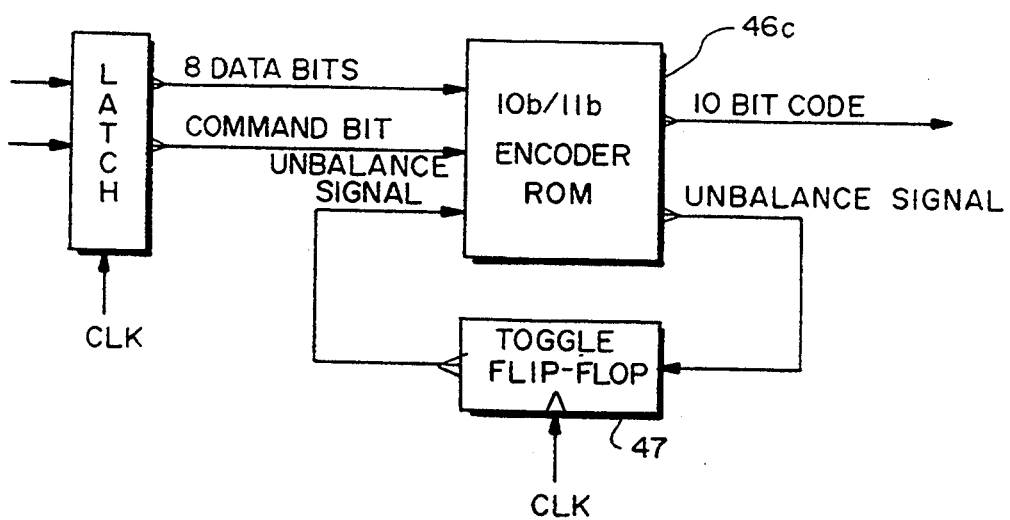
FIG. 3C is a block diagram of a single, direct 8b/10b data encoder in accordance with another embodiment of the invention.

FIG. 3C depicts an alternate type of encoder. The encoder ROM 46c can in general be the same as ROM 46 of FIG. 3B, with the exception that each location additionally includes an eleventh bit, i.e., the UNBALANCE signal, to indicate whether the other ten bits constitute a balanced codeword. This bit is fed to a toggle flip flop circuit 47 identical to the circuit 44 of FIG. 3A to produce a similar input to the decoder ROM 46c.

FIG. 3D illustrates the lookup table stored in encoder ROM 46c. The first three columns in the table represent inputs to the ROM 46c (i.e., ROM addresses), the fourth column represents the outputted 11th bit or UNBALANCE signal, and the fifth column represents the 10-bit codeword output.

The lookup table supplies the UNBALANCE signal to a toggle flip flop circuit 44a, which then applies it to the memory 46a, as described in conjunction with FIG. 3A.

e. Multiple Octet-Based Data Encoding Circuit.

Figure 4:
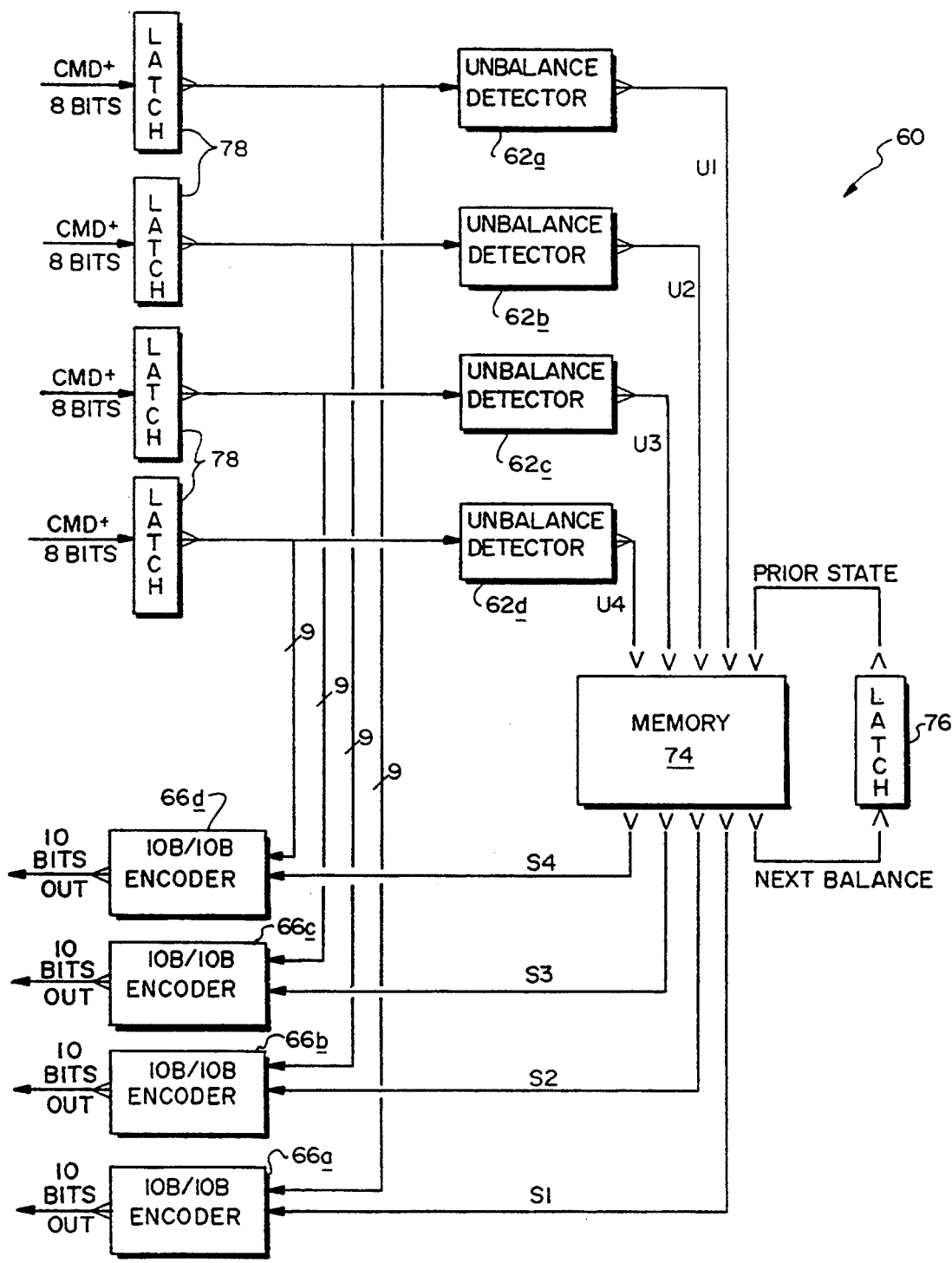
FIG. 4 is a block diagram of a circuit for concurrent encoding of multiple octet-based codewords in accordance with a third embodiment of the invention.

FIG. 4 shows a composite encoder 60 for concurrent block encoding of multiple (e.g., four) octet-based words in parallel. The circuit 60 includes four parallel unbalance detectors 62a–62d, four 10b/10b component encoders 66a–66d, each generally as shown in FIG. 3A, and a memory 74.

Attaining the minimal unbalance when four octet-based words are to be processed concurrently presents a complication not encountered in non-block encoding. Specifically, each 10-bit input word to each component encoder 66a–66d in the composite encoder 60, containing either data or command information, will indicate whether the output codeword is to be unbalanced, as described above in conjunction with FIG. 3A, but the proper choice to minimize unbalance in the block depends on the performance of all the component encoders, and thus the component encoders are inter-dependent and must rely on externally supplied information (external to each component encoder's own circuit) to minimize the unbalance of the resulting run stream.

One way of providing that external information is to supply a feed forward signal in series from one component encoder to another, and from the last component encoder back to the first, to influence the selection of succeeding codewords to obtain a minimal cumulative DC-offset. Unfortunately, this approach can not be used in some applications because the time required for the feed forward signal to ripple from encoder to encoder generally will be too long to be accomplished in a single clock cycle.

A faster and hence preferred approach is shown in FIG. 4 as entailing the use of a select-unbalance-signal generator comprising four unbalance detectors 62a–62d, a read-only memory 74, and a latch 76. The detectors 62a–62d feed their respective UNBALANCE signals U1–U4 as address signals to the memory 74, which also receives a PRIOR BALANCE signal as part of its address input. The memory 74 may be a single 5-inputs/5-outputs ROM or PLA. The memory 74 stores a SELECT UNBALANCE lookup table. The output of this lookup table is provided as a SELECT UNBALANCE signal over four signal lines S1–S4 to the composite encoders 66a–66d. The SELECT UNBALANCE signal indicates the appropriate DC unbalance state of the codeword to be selected by each of the four composite encoders 66a–66d. One NEXT BALANCE output bit of the memory 74 is provided to the latch 76 whose output is a PRIOR BALANCE signal, which indicates the unbalance to be used to generate the next SELECT UNBALANCE signal. The latch 76 holds the NEXT BALANCE signal and then supplies it to the memory 74 in the clock cycle in which the next set of four UNBALANCE signals U1–U4 is supplied from the unbalance detectors 42a–42d. Thus, the NEXT BALANCE signal is a feedback signal which is recirculated to provide a history of the prior unbalance.

Latches 78 on the circuit input lines act as buffers to receive the CMD and A7–A0 inputs and provide them in the same clock cycle both to the unbalance detectors 62a–62d and to the encoders 66a–66d. The latches 76, 78 preferably are clocked at the same time.

The SELECT UNBALANCE table stored in memory 74 is shown in FIG. 4A, wherein a PRIOR BALANCE of "0" indicates that the prior cumulative DC-offset is −1 (i.e., six "0"s and four "1"s), and a PRIOR BALANCE of "1" indicates that the prior cumulative DC-offset is +1 (i.e., six "1"s and four "0"s).

Similarly a NEXT BALANCE of "1" indicates that the next cumulative DC-offset of +1 (i.e., six "1"s and four "0"s), and a NEXT BALANCE of "0" indicates that the next unbalanced codeword should have a cumulative DC-offset of −1 (i.e., six "0"s and four "1"s).

In response to its input signals that indicate which codewords will be unbalanced, the BALANCE-TO-SELECT table selects the unbalance state to be used by the encoders 66a–66d. A "0" in one of the input columns (U1–U4) of the SELECT UNBALANCE table indicates that the selected codeword will be balanced, and a "1" indicates that it will be unbalanced. The SELECT UNBALANCE table outputs, i.e., the SELECT UNBALANCE signals, are "0" if the selected codeword is to have more "0"s than "1"s, and "1" if the selected codeword is to have more "1"s than "0"s. The SELECT UNBALANCE table shows SELECT UNBALANCE signal values of "X" (either "1" or "0") for balanced inputs because, in that case, the encoders 16a–16b preferably will output a codeword independent of the unbalance select lines.

Whenever the PRIOR BALANCE signal has a value of "1", all output bits S1–S4 from the lookup table are the binary complements of their values when the PRIOR BALANCE signal has a "0" value. As depicted in FIG. 4A, the size of the SELECT UNBALANCE table is halved in order to save space on the page, both values for the complementary entries being shown as separated by a slash. The left value is used for PRIOR BALANCE="0" and the right value for PRIOR BALANCE="1." (An alternative way to implement this is to use a bank of parallel exclusive OR gates at the output of memory 74, with each of the output signals S1–S4 of the lookup table being provided as a first input to a different one of the exclusive OR gates, and the PRIOR BALANCE signal from the latch 76 being applied as a common second input to each of the exclusive OR gates.)

f. 16b/20b Encoding Using 8b/9b and 10b/11b Sub-Encoding.

An 8b/10b code necessitates the use of some unbalanced codewords. By doubling the codeword size to 20 bits, however, a code in which all codewords are balanced can be obtained, even though the size of the input word is also doubled, to 16 bits.

To accomplish this, 10 bits of the 20-bit block must have the same logic value. Therefore, there are $C(20/10)=20!/10!*10!=184,756$ distinct balanced codewords having 20-bit lengths. Therefore, well over $2^{16}=65536$ input values can be represented by the available repertoire of balanced 20-bit codewords. (On the other hand, a 16b/19b code results in some unbalanced codewords, and a 16b/18b code results in too few codewords of any type.) A 16b/20b data encoding procedure also offers the advantage that it, like the 8b/10b code, uses input values that are a multiple of eight, and therefore are compatible with octet-based hardware and programs.

In order to perform 16b/20b encoding using ROM or PLA on CMOS chips using current technology, the 16b/20b encoding procedure preferably is divided into two or more sub-encoding procedures of approximately equal size to minimize the chip area.

Dividing the 16b/20b encoding into two 8b/10b encodings results in only $C(10/5)=252$ balanced codewords, i.e. not enough to represent the desired $2^8=256$ input values for each 8-bit input value. If unbalanced 10-bit codewords are used to augment the available repertoire, on the other hand, enough codewords can be obtained, but, of course, then a DC unbalance is being introduced.

However, if the 16b/20b encoding is divided into two unequal parts—8b/9b and a 10b/11b sub-encodings—then there are enough available balanced 20-bit composite codewords. While neither the 9-bit nor the 11-bit codeword can be balanced—odd-length codewords cannot be balanced—the 9-bit and 11-bit codewords can be constrained both to be minimally unbalanced and to have the opposite unbalance so that, when the codewords are concatenated, the resulting block is balanced.

In a 9-bit code, there are a total of $C(9/4)=126$ codewords with an excess "1" bit and 126 with an excess "0" bit. The 252 such codewords will be used separately; i.e., a 9-bit codeword and its complement will be used in this scheme to represent different input values; they will not be used as alternative ways of representing the same input value. In an 11-bit code, there are a total of $C(11/5)=462$ codewords with a single excess "1" bit and the same number of codewords with a single excess "0" bit. However, unlike the 9-bit codewords, the complementary 11-bit codewords must be used as an alternate representation of the same input; when one of the available 252 9b codewords is used, the 11-bit codeword's unbalance must complement the 9-bit codeword's unbalance to yield overall balance for the complete 20-bit block. There are therefore 252*462=116,424 codewords, more than enough to represent $2^{16}$ values.

Unfortunately, the use of all 116,424 codewords provides a very loose limit on the maximum run length of the encoded bit stream. For example, the use of 000011111 and 11111000000, when concatenated to form the 20-bit blocks, would result in a maximum run length of 10. However, the use of forward error correcting code bits permits the maximum run length to be limited—using 96-bit blocks each protected by 8 FEC bits and 8 complement FEC bits, with complementary FEC bit pairs placed between each of the four $9b$ and $11b$ sub-segments. In that case, the maximum run length using the above words would be 7.

As can be seen from the table of FIG. 2, there are a total of 391 11-bit codewords and 113 9-bit codewords with a single excess "0" bit that conform to the 3/4/3 maximum run length criteria. There are also 113 such 9-bit codewords with a single excess "1" bit. If this restricted set of codewords is used with complementary FEC pairs between each 9-bit and 11-bit codeword, then a maximum run length of 4 can be achieved. There are 391*2*113=88366 such 4-bit run length, balanced, 20-bit codewords representing data, more than enough to represent $2^{16}$=65536 input values, so 22830 codewords are available for other uses.

Of these 22830 additional codewords, one can, for example, use $2^{14}$=16,384 for codewords representing command information, i e., "command codewords." Preferably, command codewords are identified as such by the setting of a "command" line which is an input or output line that is separate from the 16 data input or output lines. In other words, the setting of the command line identifies the codeword as representing command information, while the other 16 lines specify the particular command. However, because the codeword repertoire does not allow $2^{16}$ command values, the two most significant bits are not available when the command line is active. In that case, $2^{14}$=16,384 values remain for representing command codes. That nevertheless leaves 6446 ($>4096=2^{12}$) codewords for representing an additional data type or category, which can be called "idle" codewords. It is desirable for the $16b/20b$ codewords to be able to represent not only 216 data words and $2^{14}$ command words, but also the third category of $2^{12}$ idle words.

The idle codewords can be used for a variety of purposes. For instance, they can be sent across a link for initialization purposes or sent if no data is available at the input of the link to maintain the desired maximum run stream properties (idle link). The availability of $2^{12}$ 12-bit codewords (that are used in this embodiment as idle words) also enhances the capability of the $16b/20b$ code to represent octet-based data and commands, as described below.

Although there are 88,366 balanced 20-bit data codewords providing a maximum run length of 4, it is not straightforward to implement such a code in $8b/9b$ and $10b/11b$ encoders without exceeding the repertoire of available conforming codewords. Specifically, if the encoder input lines are simply the lines that carry the 16-bit input, there is no constraint on the input values. Accordingly, the number ($2^8$=256) of possible input words to an $8b/9b$ encoder would exceed the number (226) of conforming 9-bit codewords, and the number ($2^{10}$=1024) of possible input words to a $10b/11b$ encoder would exceed the number (391) of conforming pairs of 11-bit codewords. Logic translation thus is required.

While this logic translation can be accomplished by "random logic" of AND or OR gates, a preferred implementation is a ROM or PLA lookup table. The ROM or PLA that performs the necessary translation in the data encoding process is called "pre-encoder" logic or, simply, a "precoder."

The precoder preferably generates a number of precoder codewords which, when applied as inputs to the $8b/9b$ and $10b/11b$ encoders, does not exceed the code repertoire limits of the $8b/9b$ and $10b/11b$ encoders, and yet permits the use of a high fraction of the encoders' repertoires. Also, the number of data lines that pass through the precoder preferably is a small fraction of the total 16 input data lines. Otherwise, when augmented by a command line and an idle line, the total number of lines would make the precoder ROM or PLA chip area too large. Conversely, minimizing the number of data lines translated by the precoder causes a loss in the number of values that can be sent to the $9b$ and $11b$ encoders.

As indicated above there are 226 9-bit values and 391 11-bit values that provide 20-bit balanced codes with a maximum run length of 4. Expressing these values in binary yields:

226 (dec)=11100010 (bin)
391 (dec)=110000111 (bin).

It is apparent that if no values equal to or greater than 11100000=112 are sent to the $8b/9b$ encoder, and no values equal to or greater than 110000000=384 are sent to the $10b/11b$ encoder, the inputs will not "overflow" the capability of either encoder to provide codewords. In effect, no input to the $8b/9b$ encoder should have all three most significant bits set, and no input to the $10b/11b$ encoder should have both of the two most significant bits set.

g. 16-Bit-Word-Oriented $16b/20b$ Encoder Using $8b/9b$ and $10b/11b$ Sub-Encoders.

Figure 5:
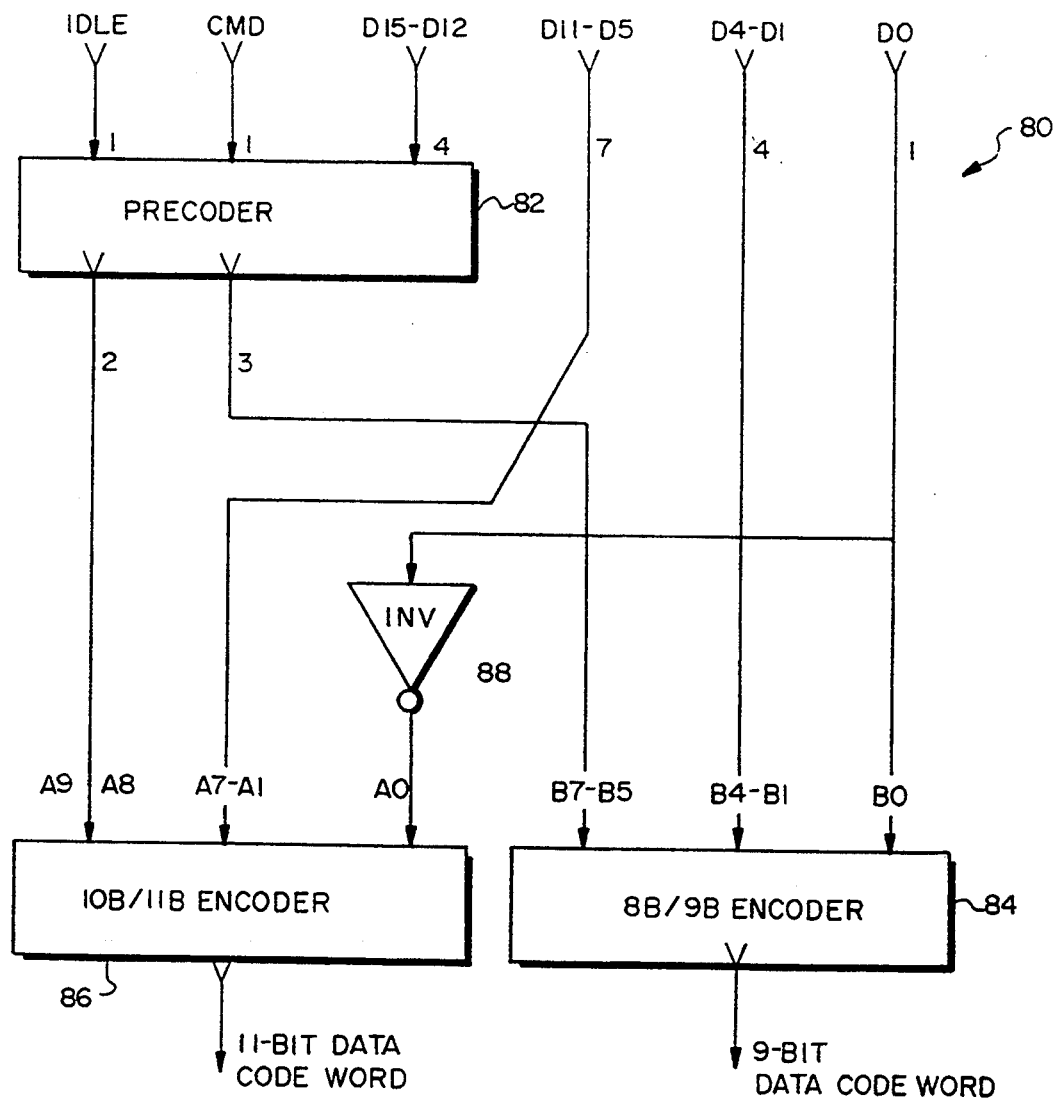
FIG. 5 is a block diagram of a 16-bit-word-oriented 16b/20b encoding circuit using 8b/9b and 10b/11b sub-encoders in accordance with a fourth embodiment of the invention.

A composite 16-bit-word-oriented $16b/20b$ encoder 80 is shown in FIG. 5. The encoder 80 includes a precoder 82, an $8b/9b$ component encoder 84, and a $10b/11b$ component encoder 86. For conceptual purposes, the drawing also depicts an inverter 88. The inputs of the encoder 80 consist of 16 bits of data D15-D0 (with D15 being the most significant bit), a command line input CMD, and an idle line input IDLE. The data input lines D11-D5 bypass the precoder 82 and are coupled directly to inputs A7-A1 of the $10b/11b$ encoder 86. The data lines D4-D1 also bypass the precoder 82 and are coupled to inputs B4-B1 of the $8b/9b$ encoder 84. The input line D0 is connected to the B0 input of the $8b/9b$ encoder 84 and determines the unbalance of the encoder output. The inverter 88 is included to indicate that the unbalance of this encoder's output is opposite that of the $8b/9b$ encoder's output, although, of course, an inverter is not necessary to achieve this result since the lookup table of the $10b/11b$ encoder 86 can be arranged to accomplish this result directly.

Encoder 84 provides an output with an excess of a single "0" if the D0 line is not set, while encoder 86 provides an output with an excess of a single "1." The output of both encoders when the D0 line is set are the complements of their outputs when it is not. The lookup tables of encoders 84, 86 respond to the signal on the D0 line to generate the required codeword. Alternatively, complementary data, of course, can be generated by using a linear array of exclusive OR circuits.

The 9-bit and 11-bit codewords stored in encoders 84 and 86, respectively, preferably are selected from a computer-generated list of codewords having a cumulative DC-offset of 1 bit and a maximum run length of 3/4/3. As described earlier under Section (b), entitled "Introduction to Run Length," this list can be generated by programming a computer to sequence through every possible 9-bit and 11-bit codeword and test each word to discover which ones satisfy both the 1-bit cumulative DC-offset criterion and the 3/4/3 maximum run length criterion. The 9-bit and 11-bit words which do satisfy both criteria are stored as codeword values in encoder ROM's 84 and 86, respectively.

The translation carried out by the precoder 82 is represented by the table of FIG. 5A. As can be seen from the right hand side of the table, A9 and A8 are never both "1" simultaneously, and not all three of B8, B7, B6 are "1" simultaneously. Therefore, the use of input values to the 8b/9b and 10b/11b encoders that would exceed the repertoire of conforming codes has been avoided. Note that the values for D14 and D15 are given as X for commands and idles and, in addition, that D12 and D13 are given as X for idles. The ROM and PLA outputs are the same regardless of the values of these lines in the indicated situations. Note also that, because of the lines bypassing the precoder 82, a total of $2^{16}$ data, $2^{14}$ command, and $2^{12}$ idle words can be encoded.

h. 16b/20b Encoder For Octet-Based Data.

In the above-described 16b/20b encoding, the input to the encoder 80 was a 16-bit word containing either data or command information, but not both. 16b/20b encoding can also accommodate octet-oriented input values; i.e., two 8-bit words. Each 8-bit input word can represent either 8-bit data or 5-bit command information. Thus, the 16-bit input value can be a data-data sequence (i.e., each octet includes data), a command-command sequence (i.e., each octet includes command information), a data-command sequence (i.e., the first octet contains data while the second octet contains command information) or a command-data sequence (i.e., the first octet contains command information while the second contains data).

In addition to the sixteen data lines, there are two additional command lines that together indicate the contents of the other sixteen, i.e., whether they are data-data, command-data, etc. In data-data sequences all sixteen lines carry data, so there are $2^{16}$ possible input words, each of which must be assigned a separate code.

The system provides for only thirty-two ($=2^5$) different possible commands; the three most significant bits of an octet that contains a command in a data-command sequence are expected to be zeros, while all eight bits of the data octet are used. For a data-command sequence, therefore, $2^5 \times 2^8 = 2^{13}$ different possible input words must be assigned codewords, and another $2^{13}$ must be assigned to command-data sequences, for a total of $2^{14}$ codewords for data-command and command-data sequences together. Another $2^5 \times 2^5 = 2^{10}$ codewords are needed for the allowed command-command sequences.

Rather than introduce additional logic to convert from two octet input words to one 16-bit input word for processing in the encoding circuit of FIG. 5, there exists a simpler approach, namely, provide a suitable precoder translation lookup table to accomplish the desired task.

Figure 6:
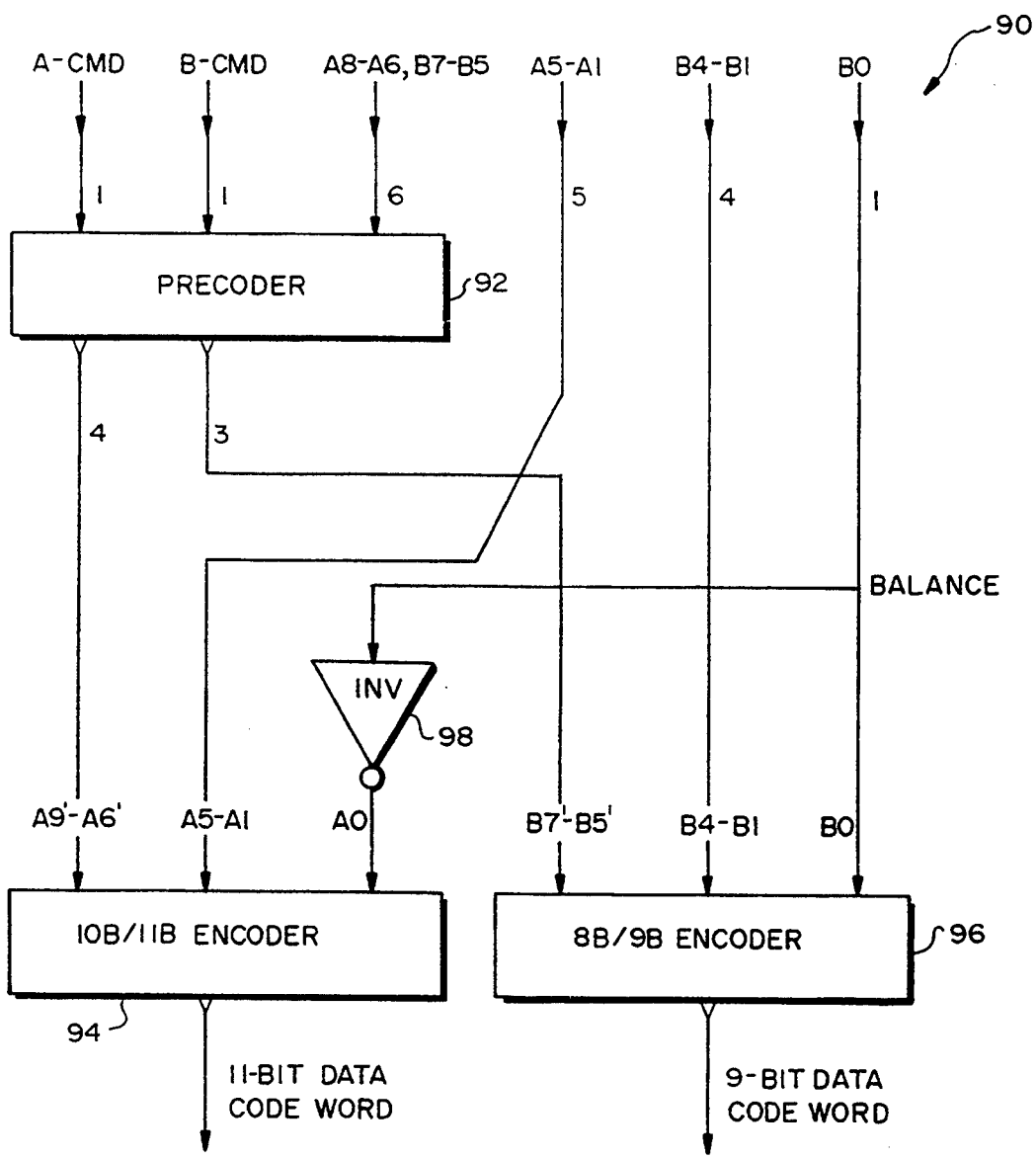
FIG. 6 is a 16b/20b encoding circuit for octet-based codewords using 8b/9b and 10b/11b sub-encoders in accordance with a fifth embodiment of the invention.

Shown in FIG. 6 is a 16b/20b encoding circuit 90 using this approach for encoding two octet-based input values. In FIG. 6, the two 8-bit inputs are represented by data lines A1–A8 and B0–B7, respectively. A 1-bit command/data line A-CMD indicates whether the 8-bit input word A1–A8 represents a command word or a data word. Another 1-bit line B-CMD indicates the same thing for input word B0–B7. A precoder 92 receives command signals A-CMD, B-CMD, and input values, e.g., data or command information, A8–A6, B7–B5. Outputs A9'–A6' from the precoder 92 are applied to a 10b/11b encoder 94, which also receives input values A5–A1. The 10b/11b encoder 94 is identical to the encoder 86 of FIG. 5. Other outputs B7'–B5' of the precoder 92 are provided to an 8b/9b encoder 96, which also receives signals B4–B1 and the BALANCE signal B0. The 8b/9b encoder 96 is identical to the encoder 84 of FIG. 5. The BALANCE signal B0 is inverted by inverter 98 and is applied as yet another input A0 to the encoder 94.

FIG. 6A shows the truth table implemented by precoder 92, where the first group of columns represent input lines (e.g., ROM address lines), and the second group of columns (denoted by "prime" superscripts) represents output lines (e.g., values stored in the ROM). In order to shorten the printed representation of the truth table in FIG. 6A, the first 64 rows of the truth table are represented by a single row in that drawing. In the table, "X" indicates a signal whose value does not affect the output. The D's indicate the corresponding entries can be either "0" or "1." Unlike X's, though, D's on the input side indicate that different values of those input signals result in different values of the output signals represented by D's.

When CA=CB=0, both input words A1–A8 and B0–B7 represent data words rather than command words. In this case, the precoder 92 performs a 1 to 1 mapping between the six precoder data inputs (B7'–B5', A9'–A6') Any one-to-one mapping may be used, so long as the mapping does not violate the two constraints necessary to prevent overflow of the 8b/9b encoder and the 10b/11b encoder. The two constraints are that at least one of the three lines B7'–B5' must assume the value LOGIC ZERO, and at least one of the two lines, A8' and A9' must assume the value LOGIC ZERO. In the table of FIG. 6A, input data for the two octets is expressed in terms of the 10b/11b encoder inputs A9–A0 and the 8b/9b encoder inputs B7–B0. External data is applied to the eight A1–A8 and eight B0–B7 lines. B0–B4 inputs bypass the precoder to directly enter the 8b/9b encoder. B0 determines the unbalance state of the 8b/9b encoder output and is inverted and sent to the A0 input of the 10b/11b encoder to force balance of its output to be complementary to that of the 8b/9b encoder output. The A1–A5 lines also bypass the precoder to directly enter the 10b/11b encoder. Input lines A6–A8 and B5–B7 as well as the command lines A-CMD and B-CMD enter the precoder (8 input lines) and seven output lines A9'–A6', B7'–B5' exit the precoder.

i. Forward Error-Correction Encoding.

The type of forward error correction code employed can be, for instance, a single error correction, double error detection code and, in particular, a Hamming distance 4 code such as devised by Hsiao (cf. the book "Error Control Coding" authored by Shu Lin & Daniel J. Costello, Jr., PRENTICE-HALL 1983, pages 498–502). Such codes are linear in that the sum of any two encoded values results in another encoded value. They are also systematic in that the encoded data portion is unchanged from the unencoded data. Therefore, in essence, an FEC bits are added to the data codewords such that the combination of FEC bits and data codewords provides distance 4 encoding. The FEC bits can be generated by multiplying a 1×B matrix data word by a B×P FEC matrix to form a 1×P FEC symbol matrix, where "B" represents the total number of bits of the data codewords in the block and "P" represents the number of FEC bits. The total number of bits in the block is L=B+P.

In the present case, an 80-bit block (i.e., 4 20-bit data codewords) is being protected by 8 FEC bits. Hence, B=80 and P=8. To generate the 80 rows of the FEC matrix, 8-bit vector sequences are used, which each contain an odd number of "1" bits, this odd number being at least 3. Because there are only 8!/3!5!=56 vector sequences with 3 "1" bits and there are 80 bits to protect, some number of the complement type of 8-bit vector sequences containing 5 "1" values must also be used. Since there are also 56 complement sequences, leading to a total of 112 (there are also an additional set of 8 vector sequences containing 7 "1" values that need not be used) and only 80 bits are to be protected, the choice of which 80 of the 112 vectors to use is arbitrary. Minimizing the number of "1" bits in the vectors can minimize the number of active gates required for encoding and decoding.

A preferred method for generating FEC bits is to use cyclically independent code sequences (i.e. sequences that can not be inter-converted by rotating sequence elements). In terms of sequences containing 3 "1" bits, the following 7 cyclically independent variations are readily enumerated:

[00000111], [00001011], [00010011], [00100011]

[01000011], [00010101], [00100101]

Rotating all of these sequences through all 8 of the possible cyclical variations produces a total of 56 FEC codes. Also, the complement sequences containing 5 "1"s can be generated by inverting all bits of the codes obtained for the case of 3 "1"s.

j. Illustrative Communication System.

Figure 7:
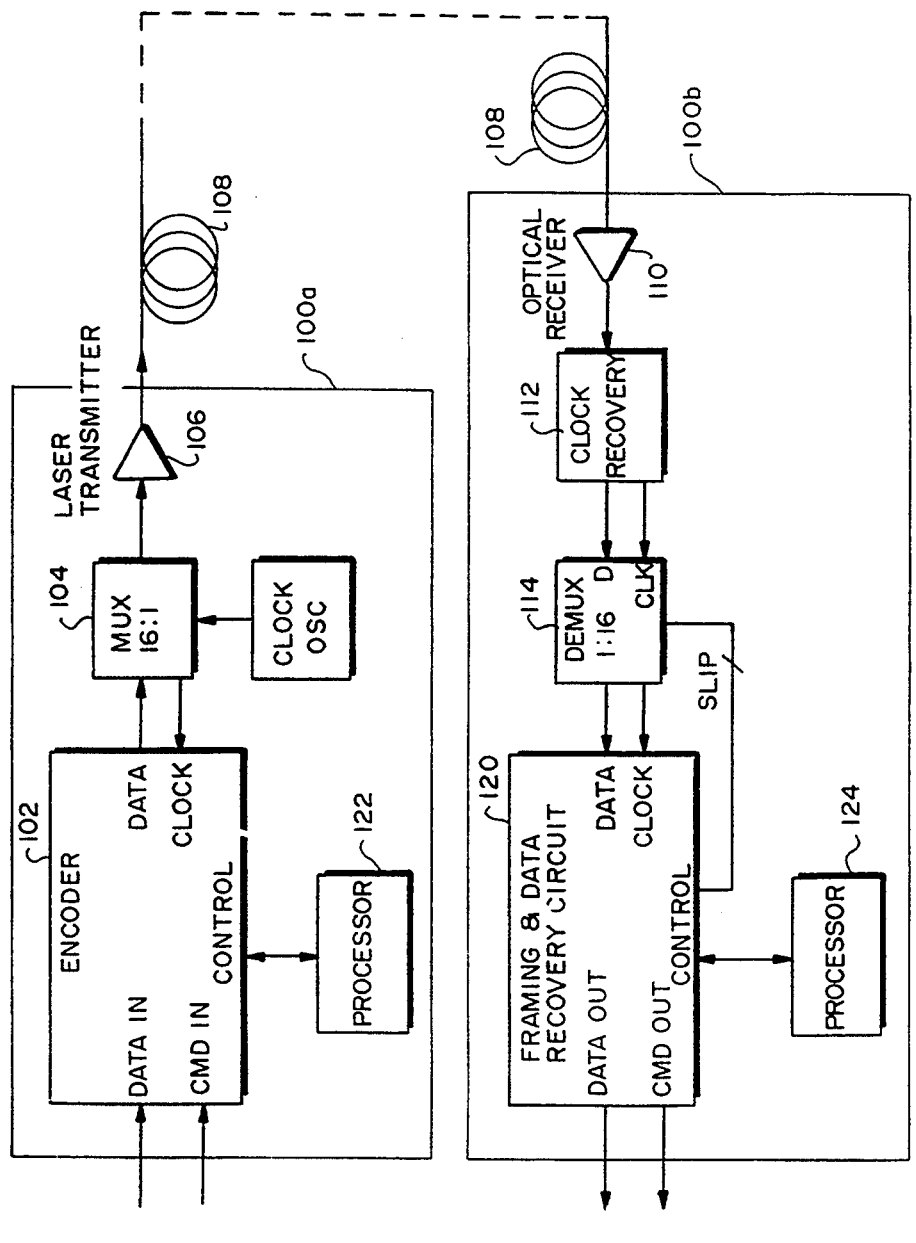
FIG. 7 is a block diagram of a communication system employing the encoding circuit of FIG. 6.

FIG. 7 shows a communication system 100 in accordance with the invention. System 100 is a point-to-point fiber optic data link. The illustrated components of system 100 are susceptible of implementation using, for example, two CMOS chips that perform data coding, decoding and framing.

System 100 includes a transmitter section 100a and a receiver section 100b. In the transmitter section 100a, input data is accepted by an encoder 102 as a 32 bit parallel stream, where it is coded and forward error correction bits are added so as to form an ECC codeword in a manner such as described above. Encoder 102 preferably is implemented as shown in FIG. 1. In the encoder 102, the data is also multiplexed up to a 16-bit parallel word, and then passed to a 16:1 multiplexer ("MUX") 104, followed by a laser transmitter 106. The serialized data is the input of a laser transmitter 106, which drives link or channel 108.

In the receiver section 100b, the optic signal received over the link 108 is converted back into an electrical signal and amplified by the optical receiver/transducer 110 and then passed to a clock recovery module 112. The clock and retimed data are recovered by the module 112 and applied to a conventional 1:16 demultiplexer 114. The demultiplexer 114 provides 16-bit sequences of the electrical signal to a framing and data recovery circuit 120. The framing and data recovery circuit 120 performs further demultiplexing, framing to determine the boundaries of the 96-bit FEC code blocks, and error correction and data decoding to obtain a recovered data stream. The recovered data stream is in the form of a 32-bit parallel stream, including 32 bits of DATA and 2 bits of CMD, similar to the form of the above-mentioned source data fed to the transmitter section 100a.

During encoding and decoding, control and status information is accessed by respective micro-processors 122,124 through registers in the encoder 102 and decoder 120.

k. Framing of the FEC Code Block and Data Decoding.

When the receiver 100b initially receives communication signals, the incoming bit stream lacks any boundaries that would identify the beginning and end of the. FEC code blocks. Consequently, the framing and decoding circuit 120 must identify those boundaries, i.e., frame the FEC code block, in order to be able to perform error correction and data decoding. This typically takes place during initialization of the receiver 100b, prior to receipt of actual data.

Figure 8:
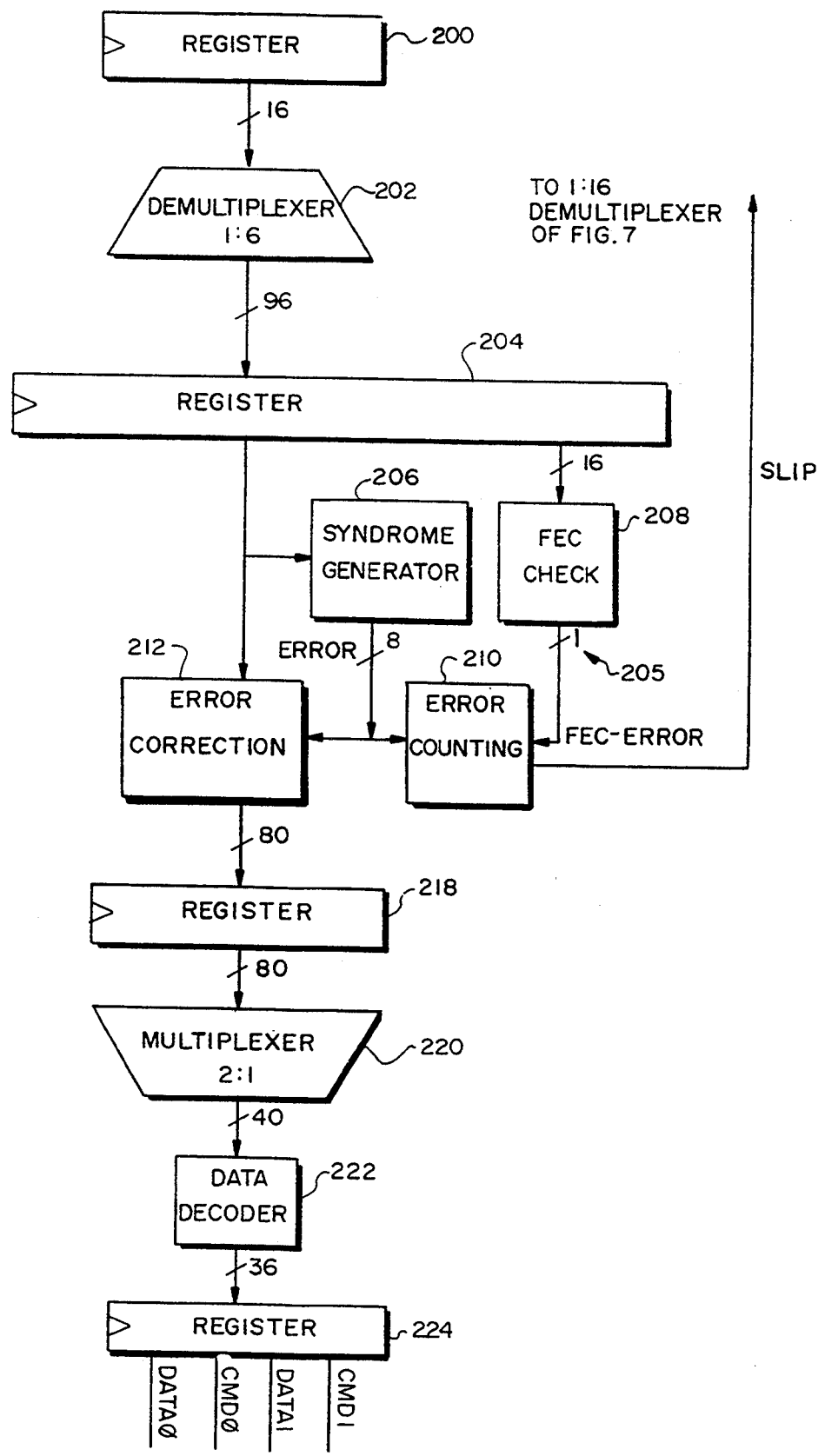
FIG. 8 is a block diagram of the framing and data recovery circuit of FIG. 7.

FIG. 8 depicts the framing and decoding circuit 120. The 16-bit sequences from the 1:16 demultiplexer 114 are applied, one at a time, to register 200. Register 200 then supplies its contents, the 16-bit sequence, to a 1:6 demultiplexer 202 which generates a 96-bit output. This 96-bit sequence is supplied to a register 204. The register 204 provides its 96-bit contents to framing circuitry 205, which includes a syndrome generator 206, an FEC check 208, and an error counter 210. The framing circuitry 205 treats each 96-bit sequence as though it were an FEC code block and calculates the number of errors contained in that block as indicated by the bits of that sequence occupying the bit positions of the FEC symbol.

Specifically, the 80 bits of the 96-bit sequence that would contain data codewords and the 8 bits that would be FEC bits if the sequence were properly framed are applied to the syndrome generator 206. The syndrome generator 206 detects errors in these 88 bits, and generates an 8-bit ERROR signal, which contains all "0"s if there is no detected error, contains an odd number of "1"s if the syndrome generator 206 detects a single-bit error, and contains an even number of "1"s if the syndrome generator 206 detects a double-bit error. Such syndrome generators are readily available as commercial parts in a single integrated circuit chip.

At the same time as the syndrome generator 206 receives an 88-bit block of the 96-bit sequence, the register 204 supplies the 16 bits from that same 96-bit sequence corresponding to the 8 FEC bits and their 8-bit complements to the FEC check 208. The FEC check 208 compares the received bits and checks whether each FEC bit is juxtaposed with its complement. If any complementary pairs are not present, the FEC check 208 asserts FEC-ERROR.

The error counting circuit 210 receives the 8-bit ERROR signal from the syndrome generator 206 and the FEC-ERROR signal from the FEC check 208. For each error indicated by the syndrome generator 206, i.e., for each single-bit or double-bit error, the error counting circuit 210 increments a counter. If, for any 96-bit block, neither the syndrome generator 206 nor the FEC check 208 detects an error, the counter is reset to zero.

If the counter reaches a pre-selected threshold, e.g., 8 errors, then the error counting circuit 210 supplies a signal, BIT SLIP, to the SLIP or SKIP input of 1:16 demultiplexer 114. This signal causes the demultiplexer 114 to skip one bit of the incoming serial data stream, as mentioned above, so as to change by one bit the alignment of the frame of the 96-bit sequence provided to register 204. (Demultiplexers having this "slip" or "skip" function are readily commercially available.) This new 96-bit sequence is then examined again by the framing circuitry 205.

This process continues until a predetermined number of 96-bit sequences (e.g., 10) are found to be error free. At that time, the receiver 100b is properly initialized and error correction and data decoding can ensue.

Conventional Hsiao error correction circuitry 212 corrects any detected errors in the data codewords of the now-framed 96-bit FEC code block, and provides the data codewords to a register 218, which then provides them to a 2:1 multiplexer 220. The 2:1 multiplexer 220 provides a first pair of the data codewords, i.e., the first 40 bits, to a data decoder 222. The data decoder 222 decodes the data codewords it received to recover the data and command information contained therein. The output of the data decoder 222 is stored in register 224 as 32-bit DATA-OUT and a 2-bit CMD-OUT values. Then the 2:1 multiplexer 220 provides the remaining two data codewords, i.e., the last 40 bits, to the decoder 222 which again generates therefrom a 32-bit DATA-OUT signal and a 2-bit CMD-OUT signal.

An illustrative embodiment of the decoder 222 will now be described. This decoder decodes data codewords formed, for example, by the encoder. The data decoder 222 has two identical, parallel decoding branches, each for decoding one of the codewords. Within each branch, the 20 bits of the received data codeword are sent to 11$b$/10$b$ and 9$b$/8$b$ decoders. Then, the three most significant bits from the 9$b$/8$b$ decoder and the two most significant bits from the 11$b$/10$b$ decoder are sent to a post-decoder that performs an operation inverse to that of the precoder 42 of FIG. 5; that is, the lookup in the table of FIG. 5A (which is contained in the pre-decoder as well as in the precoder 42) proceeds from right to left as shown in the drawing. The output of the decoding circuit is then a total of 18 lines that reproduce the input of the encoding circuit 40 of FIG. 5.

There is, however, at least one difference between the decoding circuit and the encoding circuit 40—there are no valid words in the output of the decoding circuit that correspond to both command and idle lines set. In the output of the decoding circuit, the presence of "1"s on both command and idle lines preferably is used to indicate the reception of an invalid code.

Using the system 100, the properties of the coded serial data stream are optimized for transmission over the fiber optic link 108. In accordance with various aspects of the invention, the maximum run length is kept short to aid in clock recovery and to minimize the low frequency energy, and the DC balance allows reliable code retrieval with the use of a high-gain AC-coupled receiver. Preferably, the maximum run length is four, i.e., no more than four successive LOGIC ONE's or LOGIC ZERO's may appear in the serial data stream when error free. The cumulative DC-offset preferably is limited to plus or minus four within each codeword, and to zero at the end of each 24-bit sub-block. For these values, the overall efficiency of the link 108 of system 100 is ⅔.

l. Other Data Encoding Techniques.

Hereinabove, the described encoding techniques all use double encoding, i.e., first data encoding, preferably using a 3/4/3 code, and then FEC encoding of blocks (e.g., 96-bit blocks) containing a plurality (e.g., four) of data codewords. By dispersing the FEC bits between the data codewords, a maximum run length of 4 is achieved for the resulting bit stream of the communication signal.

Many of the novel techniques of error protection encoding can be used advantageously with data encoding approaches other than those described in conjunction with the illustrative embodiments of the invention. For example, dispersal of complementary bits or the use of 96-bit FEC blocks can be used with the above-mentioned IBM 8$b$/10$b$ code. Furthermore, the error protection encoding techniques described herein can be used even where data encoding is not employed, i.e., where only protection encoding of an unencoded bit sequence is desired.

On the other hand, applications in which only data encoding is desired also can obtain many of the advantages of the present invention. In order to maintain a relatively short run length, however, preferably a 2/4/2 code, a 1/4/3 code or a 3/4/1 code is used instead of the 3/4/3 code described above, although the choice of code depends on the requirements of the application. Notwithstanding the use of different codes, the encoder circuits depicted in FIGS. 3, 4, and 5 can be adapted for data encoding input values into codewords with limited cumulative DC-offset.

For example, thee unbalance criteria for the unbalance detector circuit 42 of FIG. 3 would have to be appropriately changed with regard to the code used. For the 2/4/2 10-bit codewords, for example, the criteria would be as follows: input values from 0 through 123 would represented as unbalanced data codewords, input values from 124 to 255 would represented as balanced data codes, and values running from 256 to 303 would be represented as balanced command codewords (a total of 48 command codewords). In other words, for the 2/4/2 code, the criterion for unbalanced codewords representing data is any input value less than 124, or, expressed in binary terms, any input value of data not having all LOGIC ONE values in its five most significant bits.

The foregoing description has been limited to a specific embodiment of the invention. It will be apparent, however, that variations and modifications may be made to the invention, with the attainment of some or all of the advantages of the invention. Accordingly, it is the object of the appended claims to cover all such variations and modifications as come within the true spirit and scope of the invention. This specification is intended to be construed in an illustrative and not restrictive manner.

We claim:
1. An encoder, comprising:
A) sequence encoding means for encoding each of a plurality of bit sequences of a digital signal into a plurality of first codewords, each first codeword being characterized by a maximum run length below a pre-selected limit, and a cumulative DC-offset below a pre-selected limit, and

B) protection encoding means coupled to said sequence encoding means for receiving the first codewords therefrom and generating a plurality of error protection symbols from the first codewords.

2. The encoder in accordance with claim 1, wherein each of the first codewords is DC balanced.

3. The encoder in accordance with claim 1, further comprising means coupled to said sequence encoding means and said protection encoding means for forming a block comprising a plurality of the first codewords and a plurality of the error protection symbols.

4. The encoder in accordance with claim 3 wherein the block-forming means places at least one error protection symbol between first codewords in the block.

5. The encoder in accordance with claim 4, further comprising means coupled to said protection encoding means for forming binary complements of the error protection symbols.

6. The encoder in accordance with claim 5, wherein said block forming means is coupled to said complement forming means for receiving the complements therefrom, and forming a plurality of complement pairs, each complement pair including one of the error protection symbols and its complement, and said block forming means placing at least one of the pairs between a first and second one of said plurality of first codewords within the block.

7. The encoder in accordance with claim 6, wherein each block includes 96 bits.

8. The encoder in accordance with claim 7, wherein each block includes four 20-bit first codewords, eight bits of error protection symbols, and eight bits of the complement to said error protection symbols.

9. The encoder in accordance with claim 8, wherein the first codewords each have 3/4/3 maximum run lengths, and said block has a maximum run length of 4.

10. The encoder in accordance with claim 9, wherein each sequence includes 16 bits, and said sequence encoding means encodes each sequence into one of the 20-bit first codewords.

11. The encoder in accordance with claim 10, wherein said sequence encoding means encodes each 16-bit sequence into a 10-bit second codeword and a 10-bit third codeword, which together comprise the first codeword for the sequence.

12. The encoder in accordance with claim 11, wherein said block forming means forms each block from four of the second codewords and four of the third codewords, and places a complement pair between each of the second and third codewords and at one of the ends of the block.

13. The encoder in accordance with claim 10, wherein said sequence encoding means encodes each 16-bit sequence into a 9-bit second codeword and an 11-bit third codeword, which together comprise the first codeword for the sequence.

14. The encoder in accordance with claim 13, wherein said block forming means forms each block from four of the second codewords and four of the third codewords, and places a complement pair between each of the second and third codewords and at one of the ends of the block.

15. An encoder, comprising:
A) protection encoding means for receiving a plurality of bit sequences of a digital signal, and generating a plurality of error protection symbols from the bit sequences, and
B) means coupled to said protection encoding means for forming the binary complements of the error protection symbols.

16. The encoder in accordance with claim 15, further comprising means coupled to said protection encoding means and said complement forming means for forming a block comprising a sub-plurality of the bit sequences, the error protection symbols generated from the sub-plurality of bit sequences, and their complements.

17. The encoder in accordance with claim 16, wherein said block-forming means places at least one error protection symbol between bit sequences in the block.

18. The encoder in accordance with claim 17, wherein said block forming means forms a plurality of complement pairs, each complement pair including one of the error protection symbols and its complement, and places at least one of the complement pairs between a first and second one of the bit sequences within the block.

19. The encoder in accordance with claim 18, wherein said block forming means places one of the complement pairs between every two of the bit sequences.

20. Apparatus for decoding a block of digitally represented information comprising a plurality of data words and a plurality of pairs of error protection symbols, said data words being serially arranged in said block such that each of said data words is disposed adjacent to at least one other of said data words, each of said data words including a plurality of boundaries, each said error protection symbol pair including an error symbol and a binary complement for said error symbol, said boundaries of adjacent data words having therebetween one of said error protection symbol pairs, said decoder comprising:
A) a framer responsive to said error protection symbol pairs for determining said boundaries of said data words within said block, thereby identifying said data words and said error protection symbols; and
B) protection decoding means coupled to said framer and responsive to said error protection symbols for detecting any errors in said data words.

21. The apparatus in accordance with claim 20, wherein each of said data words comprises a codeword into which data has been encoded, and said apparatus further includes sequence decoding means coupled with said framer for decoding said codewords into a plurality of data sequences, each said first codeword being characterized by a maximum run length below a preselected limit, and a cumulative DC-offset below a preselected limit.

22. A communication system comprising:
A) a transmitter section including:
(1) an encoder comprising
a. protection encoding means for receiving a plurality of bit sequences of a digital signal, and generating a plurality of error protection symbols from said bit sequences,
b. complement-forming means coupled to said protection encoding means for forming a binary complement for each of said error protection symbols, and
c. block-forming means coupled to said protection encoding means and said complement-forming means for forming a plurality of first blocks, each of said first blocks having a bit length and comprising a plurality of said bit sequences, said error protection symbols generated from said bit sequences, and said complements corresponding to said error protection symbols, such that each of said data words has a boundary disposed adjacent to a boundary of at least one other of said data words, said boundaries of adjacent data words having therebetween an error protection pair of symbols comprising one of said error protection symbols and the corresponding complement thereto, (2) a transmitter for sending a communication signal including said first blocks over a channel; and B) a receiver section including:
   (1) a receiver for receiving said communication signal, and thereby receiving said first blocks,
   (2) framer means responsive to said error protection symbol pairs for determining said boundaries of said data words within said first blocks, thereby identifying said data words and said error protection symbols; and
   (3) protection decoding means coupled to said framer means for using said error protection symbols to detect any errors in said data words.

23. The communication system in accordance with claim 22, wherein said framer means comprises:

A) block-separation means responsive to a slip signal for separating said communication signal into a plurality of second blocks, each said second blocks having the same bit length and corresponding boundaries as each of said first blocks, and having a plurality of bits occupying a plurality of first bit positions corresponding to said bit sequences of said first blocks, a plurality of bits occupying a plurality of second bit positions corresponding to said error protection symbols, and a plurality of bits occupying a plurality of third bit positions corresponding to said complements of said error protection symbols, B) a sequence error detector coupled with said block-separation means and responsive to said bits occupying said second bit positions corresponding to said error protection symbols for generating a first error signal indicative of the number of errors, if any, in said bits occupying said first bit positions corresponding to said bit sequences of said first blocks, C) a complement-pair-error detector coupled with said block-separation means and responsive to said bits occupying said second bit positions corresponding to said error protection pairs of symbols for generating a second error signal indicative of the number of such pairs, if any, that are not binary complements of one another, and thus represent complement errors; and D) error counter means for counting said number of errors indicated by said first and second error signals, and, if said number exceeds a pre-selected threshold, sending said slip signal to said separation means for redefining said boundaries of said second blocks.

* * * * *